United States Patent
Tomita et al.

(10) Patent No.: US 12,356,100 B2
(45) Date of Patent: Jul. 8, 2025

(54) SOLID-STATE IMAGING ELEMENT AND IMAGING APPARATUS

(71) Applicant: Sony Semiconductor Solutions Corporation, Kanagawa (JP)

(72) Inventors: Kazutoshi Tomita, Kanagawa (JP); Katsuyuki Yonezawa, Kanagawa (JP); Daisuke Nakagawa, Kanagawa (JP); Parit Kanjanavirojkul, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 206 days.

(21) Appl. No.: 18/247,551

(22) PCT Filed: Aug. 16, 2021

(86) PCT No.: PCT/JP2021/029873
§ 371 (c)(1),
(2) Date: Mar. 31, 2023

(87) PCT Pub. No.: WO2022/074940
PCT Pub. Date: Apr. 14, 2022

(65) Prior Publication Data
US 2023/0412942 A1    Dec. 21, 2023

(30) Foreign Application Priority Data
Oct. 8, 2020   (JP) ................. 2020-170220

(51) Int. Cl.
*H04N 25/77* (2023.01)
*H04N 25/709* (2023.01)
*H04N 25/78* (2023.01)

(52) U.S. Cl.
CPC ........... *H04N 25/77* (2023.01); *H04N 25/709* (2023.01); *H04N 25/78* (2023.01)

(58) Field of Classification Search
CPC ...... H04N 25/77; H04N 25/709; H04N 25/78; H04N 25/00; H04N 25/616; H04N 25/627;
(Continued)

(56) References Cited

U.S. PATENT DOCUMENTS 11,509,844 B2 * 11/2022 Ramakrishnan ....... H04N 25/77
11,832,006 B2 * 11/2023 Ramakrishnan ....... H04N 25/67
(Continued)

FOREIGN PATENT DOCUMENTS

JP   2016005054 A    1/2016
JP   2020162117 A   10/2020
(Continued)

OTHER PUBLICATIONS

International Search Report (PCT/ISA/210), International Application No. PCT/JP2021/029873, dated Nov. 9, 2021.

*Primary Examiner* — Abdelaaziz Tissire
(74) *Attorney, Agent, or Firm* — Michael Best & Friedrich LLP

(57) ABSTRACT

The technology of the present disclosure improves an image quality in a solid-state imaging element that amplifies a voltage for every column.
In the solid-state imaging element, an input transistor outputs, from a drain, an output voltage corresponding to a voltage between a source and a gate to which an input voltage is input. A base side current source transistor supplies a predetermined current from the drain of the input transistor to a base node determined in advance. A feedback circuit feeds back a part of the predetermined current to the gate of the input transistor. The clamp circuit limits the output voltage to a value higher than a lower limit voltage determined in advance.

19 Claims, 28 Drawing Sheets

(58) Field of Classification Search
CPC .... H04N 25/76; H04N 25/778; H04N 25/677; H04N 25/671; H04N 25/65; H04N 25/75; H04N 25/767; H04N 25/772; H04N 25/79; H04N 25/67; H04N 25/60; H04N 25/628; H04N 25/7795; H04N 25/618; H04N 25/771; H04N 23/741
See application file for complete search history.

(56) References Cited

U.S. PATENT DOCUMENTS

| | | | |
|---|---|---|---|
| 12,155,956 B2* | 11/2024 | Nakamoto | H04N 25/778 |
| 2005/0194520 A1* | 9/2005 | Koseki | H04N 25/75 250/214 R |
| 2006/0044414 A1* | 3/2006 | Lee | H04N 25/627 348/230.1 |
| 2006/0238634 A1* | 10/2006 | Yan | H04N 25/627 348/308 |
| 2008/0030595 A1* | 2/2008 | Murakami | H04N 25/76 348/222.1 |
| 2008/0036890 A1* | 2/2008 | Yamashita | H04N 25/627 348/308 |
| 2010/0149392 A1* | 6/2010 | Hara | H04N 25/445 348/300 |
| 2018/0103222 A1* | 4/2018 | Yan | H04N 25/709 |
| 2020/0244914 A1* | 7/2020 | Kim | H01L 27/14612 |
| 2022/0272290 A1* | 8/2022 | Ramakrishnan | H04N 25/671 |
| 2023/0063737 A1* | 3/2023 | Ramakrishnan | H04N 25/67 |
| 2023/0066061 A1* | 3/2023 | Nakamoto | H04N 25/78 |

FOREIGN PATENT DOCUMENTS

| | | |
|---|---|---|
| WO | 2019087597 A1 | 5/2019 |
| WO | 2020085016 A1 | 4/2020 |

* cited by examiner a b a b

SOLID-STATE IMAGING ELEMENT AND IMAGING APPARATUS

TECHNICAL FIELD

The present technology relates to a solid-state imaging element. Specifically, the present technology relates to a solid-state imaging element and an imaging apparatus that convert an analog signal into a digital signal for every column.

BACKGROUND ART

Conventionally, in a solid-state imaging element or the like, various analog to digital converters (ADCs) of a single slope type and the like are used in order to convert an analog signal into a digital signal. For example, a solid-state imaging element has been proposed in which an ADC is arranged for every column of pixels and an amplifier is inserted between the column and the ADC (see, for example, Patent Document 1.).

CITATION LIST

Patent Document

Patent Document 1: Japanese Patent Application Laid-Open No. 2016-005054

SUMMARY OF THE INVENTION

Problems to be Solved by the Invention

In the above conventional art, a voltage of a pixel signal is amplified by inserting an amplifier to improve sensitivity. However, in the above solid-state imaging element, when significantly strong light is incident, a power supply voltage of the amplifier fluctuates, and noise occurs in the pixel signal due to the fluctuation of the power supply, and an image quality of image data may deteriorate.

The present technology has been made in view of such a situation, and an object of the present technology is to improve an image quality in a solid-state imaging element that amplifies a voltage for every column.

Solutions to Problems

The present technology has been made to solve the above problems, and a first aspect of the present technology is a solid-state imaging element including an input transistor that outputs, from a drain, an output voltage corresponding to a voltage between a source and a gate to which an input voltage is input, a base side current source transistor that supplies a predetermined current from the drain of the input transistor to a base node determined in advance, a feedback circuit that feeds back a part of the predetermined current to the gate of the input transistor, and a clamp circuit that limits the output voltage to a value higher than a lower limit voltage determined in advance. The first aspect has an effect of improving an image quality.

Furthermore, the first aspect may further include a pixel circuit that generates the input voltage by photoelectric conversion, in which the pixel circuit is provided on a pixel chip determined in advance, and the input transistor, the base side current source transistor, the feedback circuit, and the clamp circuit are provided on a circuit chip stacked on the pixel chip. The first aspect has an effect of reducing a circuit scale for each chip by a stacked structure.

In addition, in the first aspect, the clamp circuit may include a clamp transistor inserted between the drain of the input transistor and a power supply voltage determined in advance. The first aspect has an effect of limiting the output voltage.

Furthermore, in the first aspect, the power supply voltage may be a circuit side power supply voltage supplied to the circuit chip. The first aspect has an effect of suppressing a fluctuation of the current from the circuit side power supply voltage.

Furthermore, in the first aspect, the power supply voltage may be a pixel side power supply voltage supplied to the pixel chip. The first aspect has an effect of suppressing a fluctuation of the current from the pixel side power supply voltage.

Furthermore, the first aspect may further include a current mirror circuit that generates a mirror current corresponding to a clamp current flowing through the clamp transistor.

In addition, in the first aspect, the pixel circuit may supply the input voltage to the source of the input transistor via a vertical signal line determined in advance, and the current mirror circuit may draw the mirror current from the vertical signal line. The first aspect has an effect of suppressing a fluctuation of the current of the vertical signal line.

Furthermore, in the first aspect, the current mirror circuit may cause the mirror current to flow from the pixel side power supply voltage supplied to the pixel chip to a base node determined in advance. The first aspect has an effect of suppressing a fluctuation of the current from the pixel side power supply voltage.

Furthermore, in the first aspect, a voltage of the base node of the base side current source transistor may include a first base voltage, and the current mirror circuit may cause the mirror current to flow to a base node of the first base voltage. The first aspect has an effect of eliminating the need for generating a second base voltage.

Furthermore, in the first aspect, a voltage of the base node of the base side current source transistor may include a first base voltage, and the current mirror circuit may cause the mirror current to flow to a base node of a second base voltage different from the first base voltage. The first aspect has an effect of suppressing a fluctuation of an IR drop on a circuit side.

Furthermore, in the first aspect, the first base voltage and the second base voltage may be supplied from different pads. The first aspect has an effect of suppressing the fluctuation of the IR drop.

Furthermore, in the first aspect, the first base voltage and the second base voltage may be supplied from an identical pad. The first aspect has an effect of reducing the pad.

Furthermore, in the first aspect, the first base voltage may be supplied to a P layer provided in a P well, and the second base voltage may be supplied to an N layer provided in the P well. The first aspect has an effect of eliminating the need for a deep N well.

Furthermore, in the first aspect, the second base voltage may be supplied from the P layer and the N layer provided in the P well. The first aspect has an effect of suppressing a back gate effect due to an IR drop difference.

Furthermore, in the first aspect, a power supply voltage of the current mirror circuit may be supplied to an N layer provided in a deep N well.

Furthermore, in the first aspect, the clamp circuit may limit the output voltage in accordance with an enable signal determined in advance. The first aspect has an effect of setting validity and invalidity of a clamp operation.

Furthermore, in the first aspect, the clamp circuit may include a clamp transistor connected in parallel to the input transistor between the drain and the source of the input transistor. The first aspect has an effect of limiting the output voltage.

Furthermore, a second aspect of the present technology is an imaging apparatus including an input transistor that outputs, from a drain, an output voltage corresponding to a voltage between a source and a gate to which an input voltage is input, a base side current source transistor that supplies a predetermined current from the drain of the input transistor to a base node determined in advance, a feedback circuit that feeds back a part of the predetermined current to the gate of the input transistor, a clamp circuit that limits the output voltage to a value higher than a lower limit voltage determined in advance, and an analog to digital converter that converts the output voltage into a digital signal. The second aspect has an effect of improving an image quality of image data in which digital signals are aligned.

MODE FOR CARRYING OUT THE INVENTION

Hereinafter, embodiments for implementing the present technology (hereinafter referred to as embodiments) will be described. The description will be made in the following order.

1. First embodiment (example in which clamp circuit limits output voltage)
2. Second embodiment (example in which clamp circuit connected to power supply on pixel side limits output voltage)
3. Third embodiment (example in which clamp circuit limits output voltage and current mirror circuit is provided)
4. Fourth embodiment (example in which clamp circuit limits output voltage and current mirror circuit connected to power supply on pixel side is provided)
5. Fifth embodiment (example in which clamp circuit limits output voltage and current mirror circuit having changed base voltage is provided)

6. Sixth embodiment (example in which clamp circuit limits output voltage and current mirror circuit connected to power supply on pixel side and having changed base voltage is provided)

7. Seventh embodiment (example in which clamp circuit connected to in parallel to input transistor limits output voltage)

8. Example of application to mobile body

1. First Embodiment

[Configuration Example of Imaging Apparatus]

Figure 1:
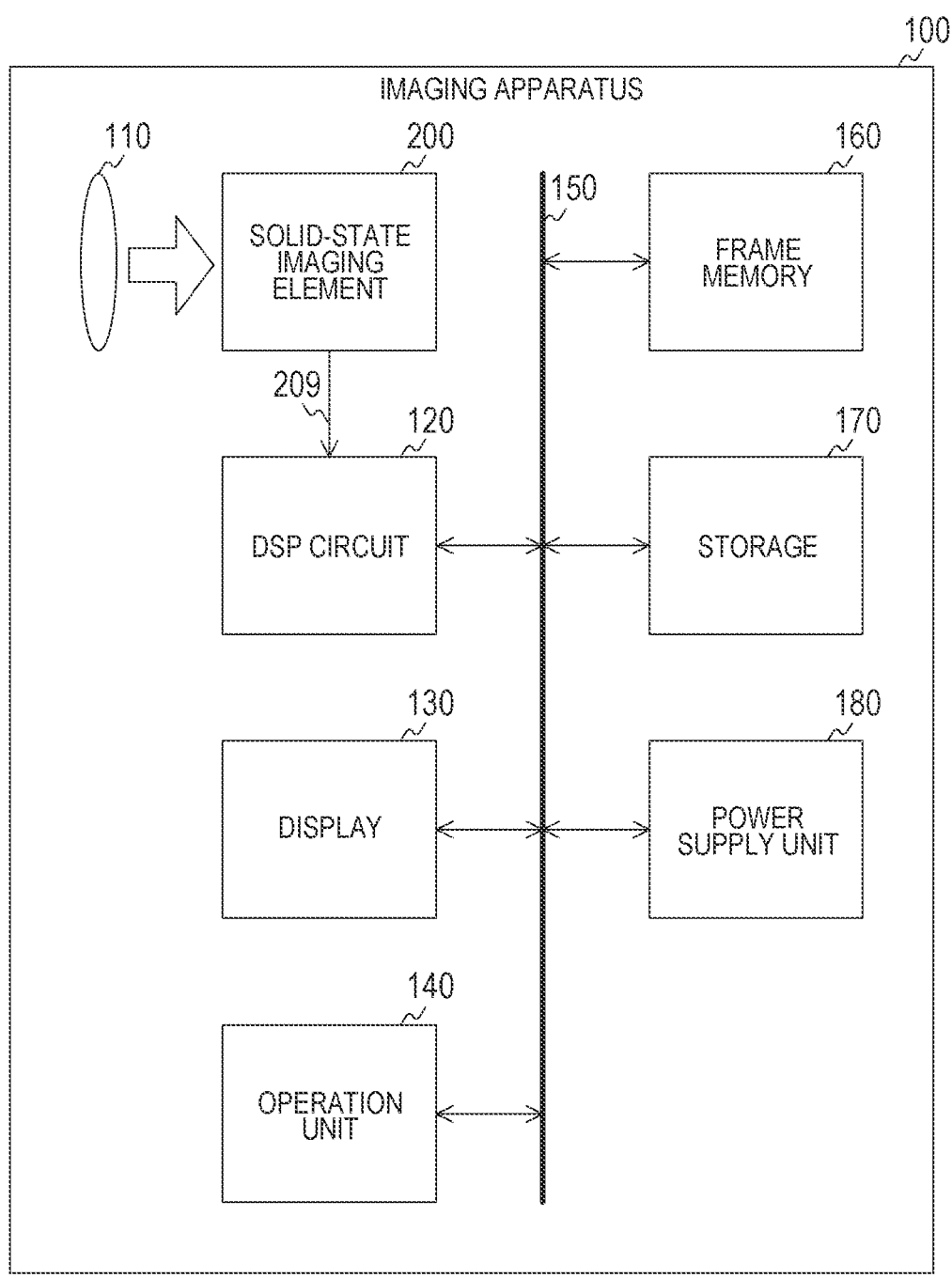
FIG. 1 is a block diagram depicting a configuration example of an imaging apparatus according to a first embodiment of the present technology.

FIG. 1 is a block diagram depicting a configuration example of an imaging apparatus 100 according to a first embodiment of the present technology. The imaging apparatus 100 is a device for imaging image data (frame), and includes an optical unit 110, a solid-state imaging element 200, and a digital signal processing (DSP) circuit 120. The imaging apparatus 100 further includes a display 130, an operation unit 140, a bus 150, a frame memory 160, a storage 170, and a power supply unit 180. As the imaging apparatus 100, for example, in addition to a digital camera such as a digital still camera, a smartphone, a personal computer, a vehicle-mounted camera, or the like having an imaging function is assumed.

The optical unit 110 condenses light from a subject and guides the light to the solid-state imaging element 200. The solid-state imaging element 200 generates a frame by photoelectric conversion in synchronization with a vertical synchronization signal. Here, the vertical synchronization signal is a periodic signal of a predetermined frequency indicating imaging timing. The solid-state imaging element 200 supplies the generated image data to the DSP circuit 120 via a signal line 209.

The DSP circuit 120 executes predetermined signal processing on a frame from the solid-state imaging element 200. The DSP circuit 120 outputs the processed frame to the frame memory 160 or the like via the bus 150.

The display 130 displays a frame. As the display 130, for example, a liquid crystal panel or an organic electro luminescence (EL) panel is assumed. The operation unit 140 generates an operation signal in accordance with operation by a user.

The bus 150 is a common path for the optical unit 110, the solid-state imaging element 200, the DSP circuit 120, the display 130, the operation unit 140, the frame memory 160, the storage 170, and the power supply unit 180 to exchange data with each other.

The frame memory 160 holds image data. The storage 170 stores various data such as frames. The power supply unit 180 supplies power to the solid-state imaging element 200, the DSP circuit 120, the display 130, and the like.

[Configuration Example of Solid-State Imaging Element]

Figure 2:
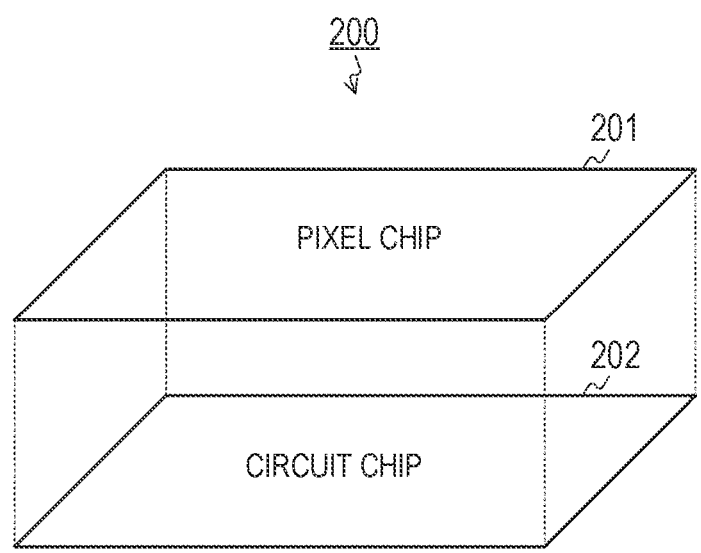
FIG. 2 is a diagram of an example of a stacked structure of a solid-state imaging element according to the first embodiment of the present technology.

FIG. 2 is a diagram depicting an example of a stacked structure of the solid-state imaging element 200 according to the first embodiment of the present technology. The solid-state imaging element 200 includes a circuit chip 202 and a pixel chip 201 stacked on the circuit chip 202. These chips are electrically connected via a connection portion such as a via. Note that, in addition to the via, the chips can be connected by Cu—Cu bonding or a bump.

Figure 3:
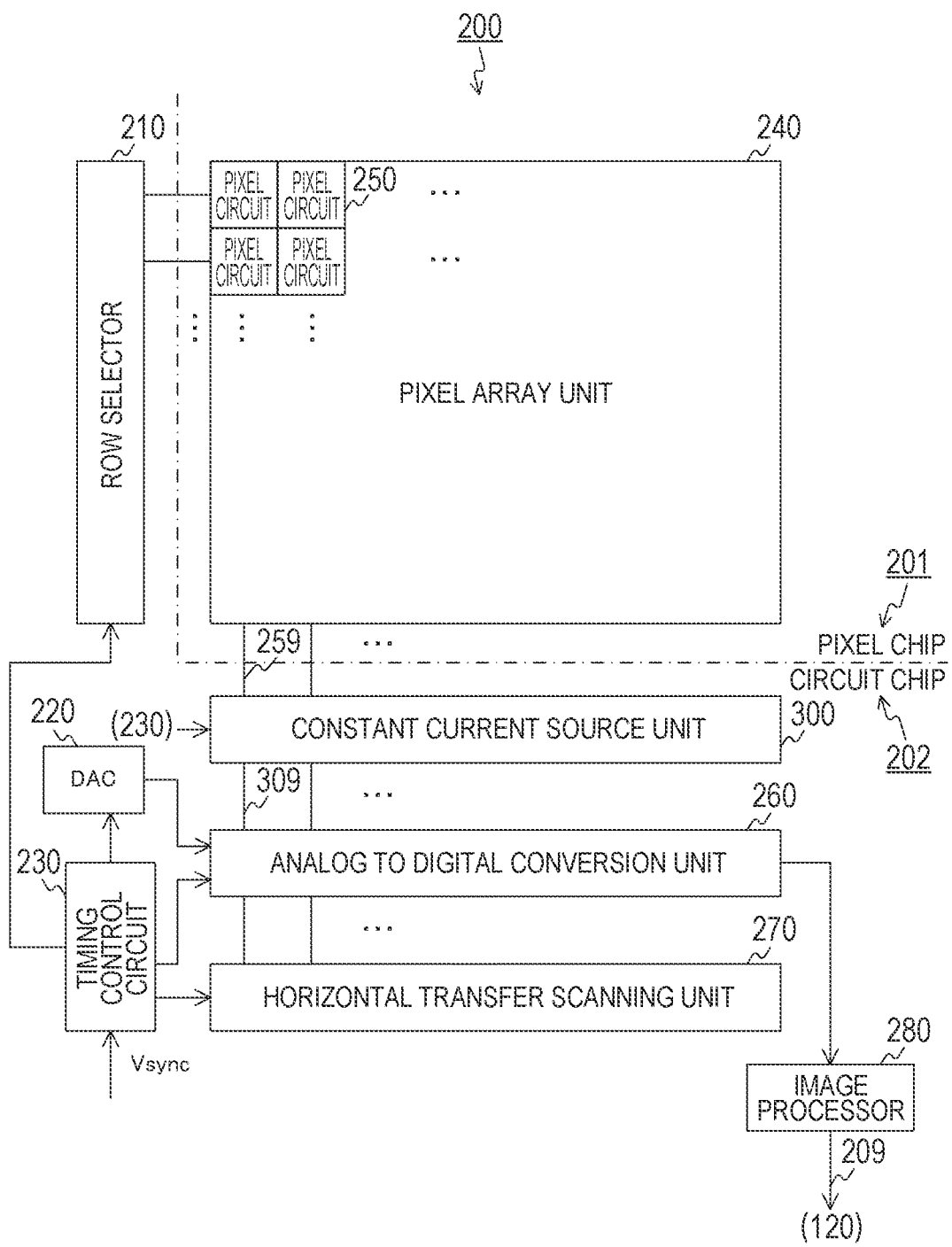
FIG. 3 is a block diagram depicting a configuration example of the solid-state imaging element according to the first embodiment of the present technology.

FIG. 3 is a block diagram depicting a configuration example of the solid-state imaging element 200 according to the first embodiment of the present technology. The solid-state imaging element 200 includes a row selector 210, a digital to analog converter (DAC) 220, and a timing control circuit 230. Furthermore, the solid-state imaging element 200 includes a pixel array unit 240, a constant current source unit 300, an analog to digital conversion unit 260, a horizontal transfer scanning unit 270, and an image processor 280.

In addition, in the pixel array unit 240, a plurality of pixel circuits 250 is aligned in a two-dimensional lattice pattern. Hereinafter, a group of pixel circuits 250 aligned in a predetermined horizontal direction is referred to as a "row", and a set of pixel circuits 250 aligned in a direction perpendicular to the horizontal direction is referred to as a "vertical group" or a "column".

The timing control circuit 230 controls an operation timing of each of the row selector 210, the DAC 220, the constant current source unit 300, the analog to digital conversion unit 260, and the horizontal transfer scanning unit 270 in synchronization with the vertical synchronization signal Vsync.

The row selector 210 sequentially selects and drives the rows, and outputs an analog pixel signal to the analog to digital conversion unit 260 via the constant current source unit 300.

The pixel circuits 250 generate an analog pixel signal by photoelectric conversion under the control of the row selector 210. Each of the pixel circuits 250 outputs a pixel signal to the constant current source unit 300 via a vertical signal line 259.

In the constant current source unit 300, a constant current is supplied for each column. In addition, a column amplifier that amplifies a pixel signal is provided for every column.

The DAC 220 generates a reference signal by digital to analog (DA) conversion and supplies the reference signal to the analog to digital conversion unit 260. For example, a ramp signal having a sawtooth form is used as the reference signal.

The analog to digital conversion unit 260 converts an analog input signal into a digital signal for every column by using the reference signal. The analog to digital conversion unit 260 supplies a digital signal to the image processor 280 under the control of the horizontal transfer scanning unit 270.

The horizontal transfer scanning unit 270 controls the analog to digital conversion unit 260 to sequentially output digital signals.

The image processor 280 performs predetermined image processing on a frame in which digital signals are aligned. The image processor 280 supplies the processed frame to the DSP circuit 120.

Furthermore, the above-described circuits in the solid-state imaging element 200 are disposed on the pixel chip 201 and the circuit chip 202 in a distributed manner. For example, the pixel array unit 240 is provided on the pixel chip 201, and circuits (such as the analog to digital conversion unit 260) other than the pixel array unit 240 are disposed on the circuit chip 202. Note that the circuits disposed on the pixel chip 201 and the circuit chip 202 are not limited to this combination. For example, the pixel array unit 240, the constant current source unit 300, and a comparator in the analog to digital conversion unit 260 can be disposed on the pixel chip 201, and the other circuits can be disposed on the circuit chip 202.

[Configuration Example of Pixel Circuit]

Figure 4:
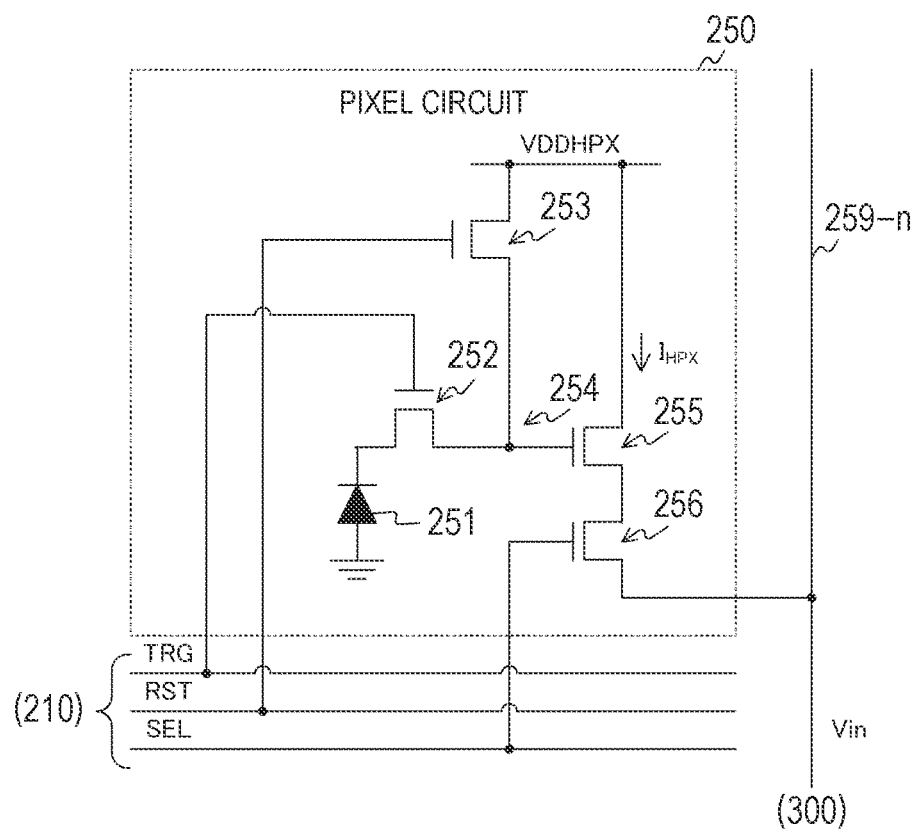
FIG. 4 is a circuit diagram depicting a configuration example of a pixel circuit according to the first embodiment of the present technology.

FIG. 4 is a circuit diagram depicting a configuration example of the pixel circuit 250 according to the first embodiment of the present technology. The pixel circuit 250 includes a photoelectric conversion element 251, a transfer transistor 252, a reset transistor 253, a floating diffusion layer 254, an amplification transistor 255, and a selection transistor 256. Furthermore, a power supply voltage VDDHPX is supplied to the pixel circuit 250.

The photoelectric conversion element 251 photoelectrically converts incident light to generate electric charges. The transfer transistor 252 transfers electric charges from the photoelectric conversion element 251 to the floating diffusion layer 254 in accordance with a transfer signal TRG from the row selector 210. The reset transistor 253 initializes an electric charge amount of the floating diffusion layer 254 in accordance with a reset signal RST from the row selector 210.

The floating diffusion layer 254 accumulates electric charges and generates a voltage corresponding to the electric charge amount. The amplification transistor 255 amplifies the voltage of the floating diffusion layer 254. The selection transistor 256 outputs a signal of the amplified voltage as a pixel signal SIG in accordance with a selection signal SEL from the row selector 210. Assuming that the number of vertical groups is N (N is an integer), the pixel signal of the n-th (n is an integer of 1 to N) vertical group is transmitted to the constant current source unit 300 via a vertical signal line 259-n.

Note that the circuit of the pixel circuit 250 is not limited to the circuit illustrated in the drawing as long as the circuit can generate a pixel signal by photoelectric conversion.

[Configuration Example of Constant Current Source Unit]

Figure 5:
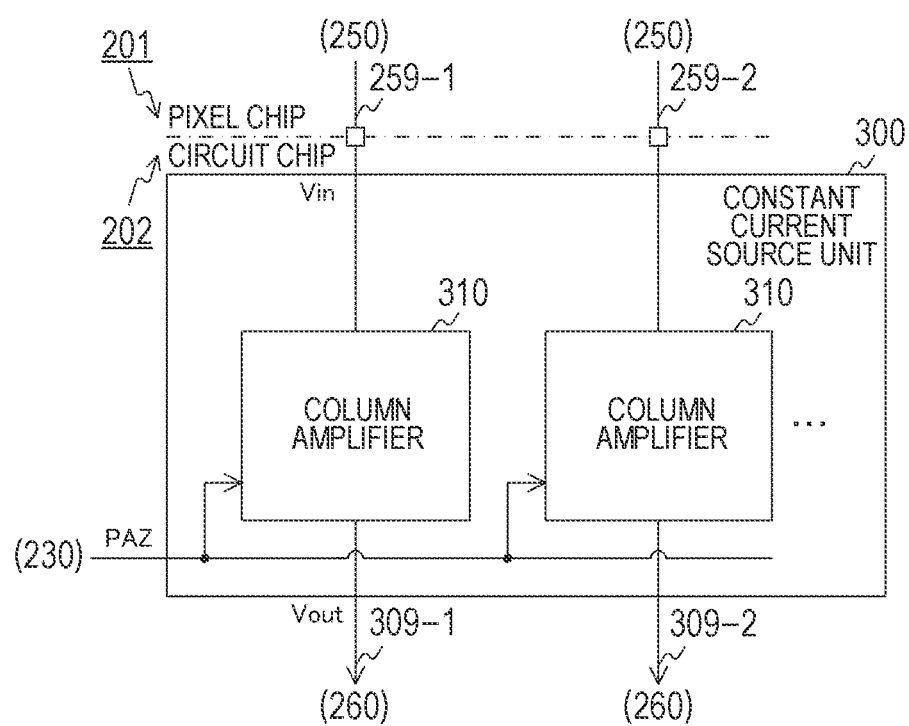
FIG. 5 is a block diagram depicting a configuration example of a constant current source unit according to the first embodiment of the present technology.

FIG. 5 is a block diagram depicting a configuration example of the constant current source unit 300 according to the first embodiment of the present technology. In the constant current source unit 300, a column amplifier 310 is disposed for every column. Assuming that the number of vertical groups is N, N column amplifiers 310 are disposed.

The pixel signal of the corresponding vertical group is input to the n-th column amplifier 310 via the vertical signal line 259-n. The column amplifier 310 amplifies the voltage of the pixel signal and outputs the amplified voltage to the analog to digital conversion unit 260 via a signal line 309-n. Hereinafter, the voltage of the pixel signal before amplification is referred to as "input voltage Vin", and the voltage after amplification is referred to as "output voltage Vout". In addition, the column amplifier 310 is initialized by an auto zero signal PAZ from the timing control circuit 230.

[Configuration Example of Column Amplifier]

Figure 6:
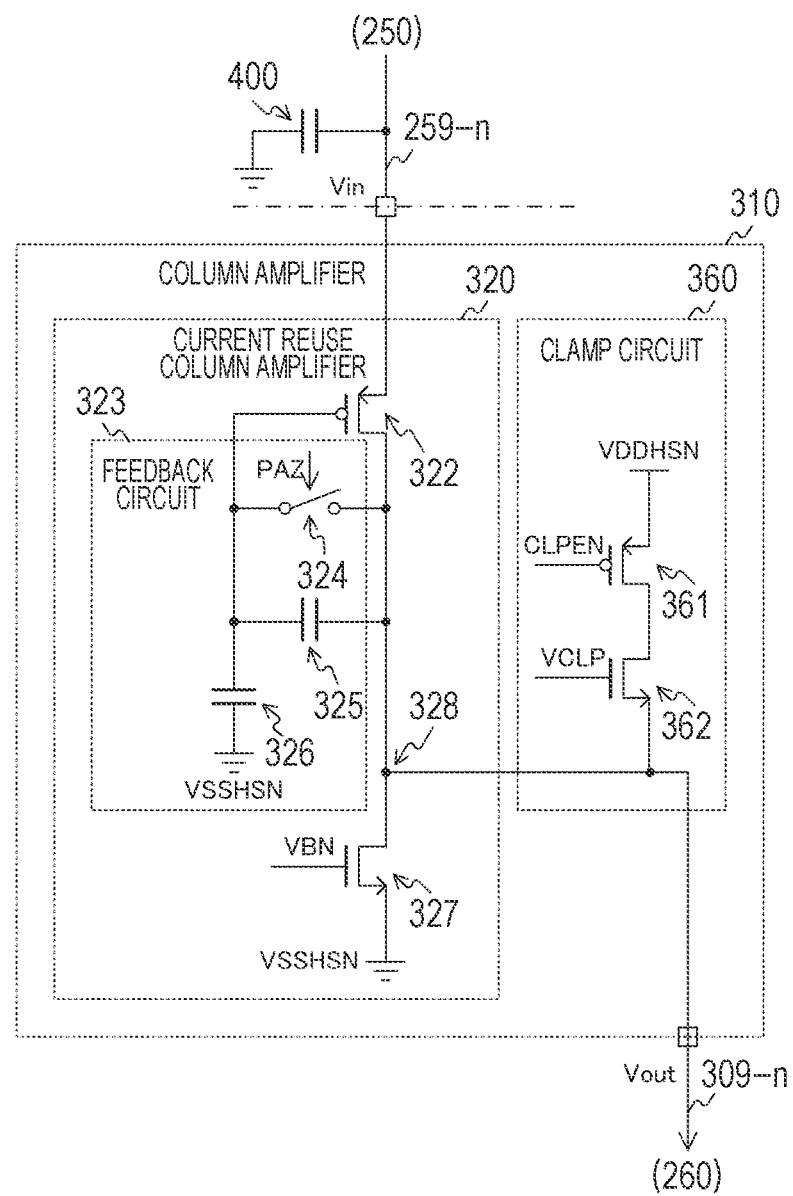
FIG. 6 is a circuit diagram depicting a configuration example of a column amplifier according to the first embodiment of the present technology.

FIG. 6 is a circuit diagram depicting a configuration example of the column amplifier 310 according to the first embodiment of the present technology. The column amplifier 310 is provided with a current reuse column amplifier 320 and a clamp circuit 360. Hereinafter, the current reuse column amplifier 320 is referred to as a "current reuse column amp (CRCA)". The CRCA includes an input transistor 322, a feedback circuit 323, and a base side current source transistor 327. The feedback circuit 323 includes an input side auto zero switch 324, a feedback capacitance 325, and a base side capacitance 326. In addition, in the drawing, a VSL capacitance 400 connected to the vertical signal line 259-n indicates a wiring capacitance between the vertical signal line 259-n and a base voltage (such as a ground voltage).

Furthermore, as the input transistor 322, for example, a p-channel MOS (pMOS) transistor is used. As the base side current source transistor 327, for example, an nMOS transistor is used.

A source of the input transistor 322 is connected to the vertical signal line 259-n, and a drain of the input transistor 322 is connected to a drain of the base side current source transistor 327. Furthermore, the pixel circuit 250 generates a pixel signal by photoelectric conversion, and inputs the voltage to the source of the input transistor 322 via the vertical signal line 259-n as the input voltage Vin.

In addition, a source of the base side current source transistor 327 is connected to a base node of a base voltage VSSHSN determined in advance. A bias voltage VBN determined in advance is applied to a gate of the base side current source transistor 327, and the base side current source transistor 327 supplies a constant bias current corresponding to the bias voltage VBN.

In addition, the output voltage Vout is output from an output node 328 between the input transistor 322 and the base side current source transistor 327 to the analog to digital conversion unit 260 via the signal line 309-n.

In the feedback circuit 323, the feedback capacitance 325 is inserted between the output node 328 and a gate of the input transistor 322. In addition, the base side capacitance 326 is inserted between the gate of the input transistor 322 and the base node of the base voltage VSSHSN. The input side auto zero switch 324 opens and closes a path between the output node 328 and the gate of the input transistor 322 in accordance with the auto zero signal PAZ.

In the above configuration, a gate-source voltage $V_{GS}$ of the input transistor 322 fluctuates in response to the input voltage Vin input to the source of the input transistor 322, and a drain current of the input transistor 322 changes. The output voltage Vout corresponding to the drain current is output from the drain (that is, the output node 328) of the input transistor 322. In this manner, the output voltage corresponding to the gate-source voltage of the input transistor 322 is output from the drain the input transistor 322. Furthermore, a part of the constant bias current supplied from the base side current source transistor 327 is fed back to the gate of the input transistor 322 by the feedback circuit 323.

The CRCA feeds back a part of the current of the current source (base side current source transistor 327) to the gate of the input transistor 322, and thus amplification can be performed only by the current of the current source. As a result, an increase in power consumption can be suppressed.

The clamp circuit 360 includes an enable transistor 361 and a clamp transistor 362. For example, a pMOS transistor is used as the enable transistor 361, and for example, an nMOS transistor is used as the clamp transistor 362. The enable transistor 361 and the clamp transistor 362 are inserted in series between a node of the power supply voltage VDDHSN supplied into the circuit chip 202 and the drain of the input transistor 322. Note that the power supply voltage VDDHSN is an example of a circuit side power supply voltage described in the claims.

An enable signal CLPEN from the timing control circuit 230 is input to a gate of the enable transistor 361. Furthermore, a bias voltage VCLP determined in advance is input to a gate of the clamp transistor 362.

The clamp transistor 362 limits the output voltage Vout to a value higher than a lower limit voltage $V_L$ determined in advance. As an amount of light incident on the pixel circuit 250 increases, the output voltage Vout decreases and an amplitude increases. By a function of the clamp transistor 362, the output voltage Vout is fixed (clamped) to the lower limit voltage $V_L$ even when a large-amplitude pixel signal of full scale or more is input. Hereinafter, an operation in which the clamp transistor 362 limits the output voltage Vout is referred to as "clamp operation".

The lower limit voltage $V_L$ is adjusted by the bias voltage VCLP. A voltage necessary for the base side current source transistor 327 to operate in a saturation region is set as the lower limit voltage $V_L$. For example, in order for the base side current source transistor 327 to operate in the saturation region, the following formulae need to be satisfied.

$$Vds \geq Vdsat \quad \text{Formula 1}$$

$$Vdsat = Vgs - Vth \quad \text{Formula 2}$$

In Formulas 1 and 2, Vds and Vgs are a drain-source voltage and a gate-source voltage of the base side current source transistor 327. Vth is a threshold voltage of the base side current source transistor 327.

From Formulae 1 and 2, a voltage obtained by adding a margin as necessary to a difference between the gate voltage (bias voltage VBN) of the base side current source transistor 327 and the threshold voltage Vth is set as the lower limit voltage $V_L$.

Furthermore, the enable signal CLPEN is a signal for enabling or disabling the clamp operation of the clamp circuit 360. For example, in a case where the enable signal CLPEN is enabled, a low level is set to the enable signal CLPEN, and in a case where the enable signal CLPEN is disabled, a high level is set to the enable signal CLPEN. Note that the enable transistor 361 is provided as necessary. The enable transistor 361 is not required to be provided in the clamp circuit 360.

Here, a configuration in which the clamp circuit 360 is not provided is assumed as a comparative example. In this comparative example, when significantly strong light is incident on the pixel circuit 250, there is a possibility that the output voltage Vout decreases to the full scale or more, Formulas 1 and 2 cannot be satisfied, and the base side current source transistor 327 operates in a linear region. In a case where the base side current source transistor 327 operates in the linear region, the current supplied by the transistor is not constant, and the power supply voltage VDDHPX of the pixel circuit 250 and the base voltage VSSHSN connected to the source of the base side current source transistor 327 fluctuate in the column on which the strong light is incident. Assuming that the column is an aggressor and another column is a victim, the output voltage of the victim fluctuates due to the fluctuation of the power supply voltage and the base voltage generated in the aggressor, and deviates from the original level. As a result, noise occurs in the image data. This phenomenon is called streaking.

However, by providing the clamp circuit 360, it is possible to limit a decrease in the output voltage Vout and operate the base side current source transistor 327 in the saturation region. Thus, voltage fluctuation can be suppressed, and occurrence of streaking can be suppressed. As a result, an image quality of the image data can be improved.

However, it should be noted that the clamp operation causes a current to flow through the clamp transistor 362, and due to the current, the value of the current from the power supply voltage VDDHPX decreases accordingly. There is a possibility that this current fluctuation causes the voltage of the floating diffusion layer 254 to fluctuate via the parasitic capacitance between a gate and a drain of the amplification transistor 255. This voltage fluctuation becomes a problem particularly in a case where the capacitance of the floating diffusion layer 254 is relatively small or in a case where the parasitic capacitance of the amplification transistor 255 is relatively large. This problem can be solved by providing a current mirror circuit as described later.

[Configuration Example of Analog to Digital Conversion Unit]

Figure 7:
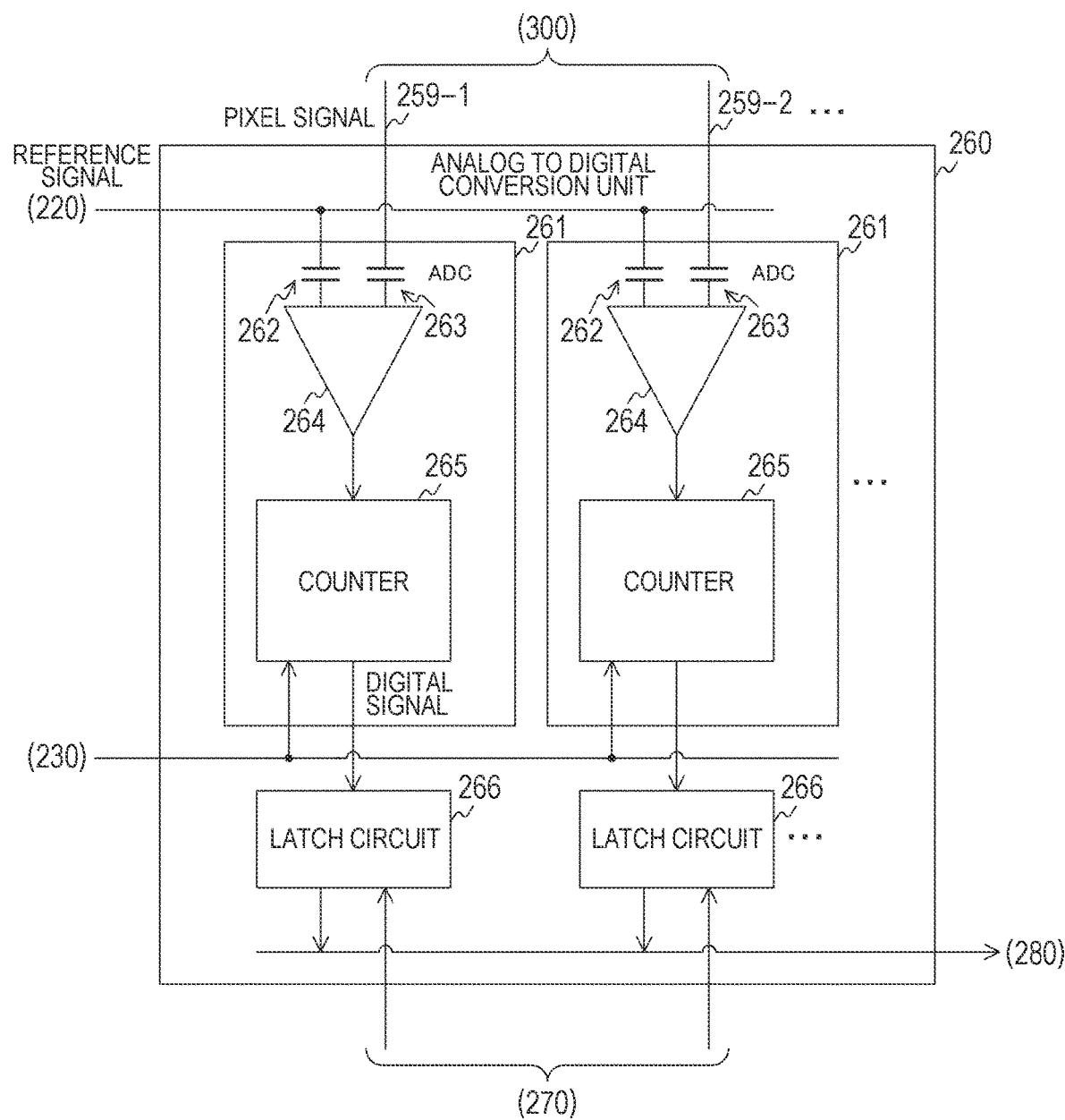
FIG. 7 is a block diagram depicting a configuration example of an analog to digital conversion unit according to the first embodiment of the present technology.

FIG. 7 is a block diagram depicting a configuration example of the analog to digital conversion unit 260 according to the first embodiment of the present technology. In the analog to digital conversion unit 260, ADCs 261 and latch circuits 266 are disposed for every column. Assuming that the number of vertical groups is N, N ADCs 261 and N latch circuits 266 are arranged.

The ADC 261 converts an analog pixel signal of the into a digital signal. The ADC 261 includes capacitances 262 and 263, a comparator 264, and a counter 265. Furthermore, correlated double sampling (CDS) processing is executed by the ADC 261.

The comparator 264 compares the reference signal from the DAC 220 with the pixel signal of the corresponding vertical group. The comparator 264 is provided with a pair of input terminals, and the reference signal is input to one of the input terminals via the capacitance 262, and the pixel signal is input to the other input terminal via the capacitance 263. The comparator 264 supplies a comparison result to the counter 265.

The counter 265 counts a count value over a period until the comparison result is inverted under the control of the timing control circuit 230. The counter 265 outputs a signal indicating the count value to the latch circuit 266 as a digital signal.

The latch circuit 266 holds the digital signal. The latch circuit 266 outputs the digital signal to the image processor 280 in synchronization with a synchronization signal from the horizontal transfer scanning unit 270.

As described above, in the first embodiment of the present technology, since the clamp circuit 360 limits the output voltage Vout to a value higher than the lower limit voltage $V_L$, the base side current source transistor 327 can be operated in the saturation region. As a result, streaking that occurs in a case where the base side current source transistor 327 operates in the linear region can be suppressed, and the image quality of the image data can be improved.

[First Modification]

In the first embodiment described above, negative feedback is formed by the feedback circuit 323. However, in this configuration, a feedback rate is too small to obtain a sufficient loop gain, and there is a possibility that linearity is deteriorated. The column amplifier 310 according to a first modification of the first embodiment is different from the column amplifier 310 according to the first embodiment in that linearity is improved by adding a cascode transistor.

Figure 8:
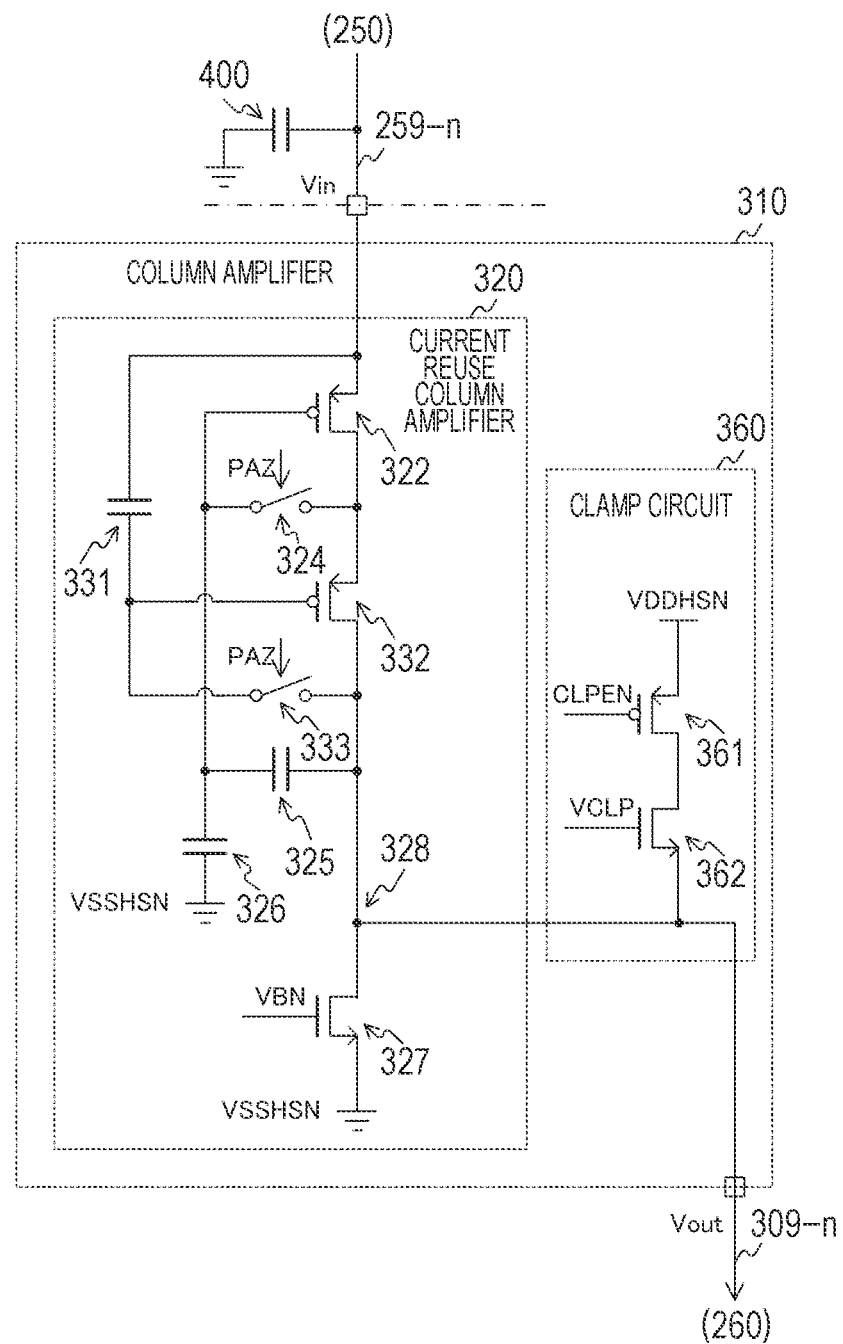
FIG. 8 is a circuit diagram depicting a configuration example of a column amplifier according to a first modification of the first embodiment of the present technology.

FIG. 8 is a circuit diagram depicting a configuration example of the column amplifier 310 according to the first modification of the first embodiment of the present technology. The current reuse column amplifier 320 according to the first modification of the first embodiment is different from the current reuse column amplifier 320 according the first embodiment in that a cascode capacitance 331, a cascode transistor 332, and a cascode side auto zero switch 333 are further included. As the cascode transistor 332, for example, a pMOS transistor is used.

The cascode transistor 332 is inserted between the drain of the input transistor 322 and the drain of the base side current source transistor 327 (load MOS). Furthermore, the cascode capacitance 331 is inserted between the source (that is, the vertical signal line 259-$n$) of the input transistor 322 and a gate of the cascode transistor 332.

The cascode side auto zero switch 333 opens and closes a path between the gate and the drain of the cascode transistor 332 in accordance with the auto zero signal PAZ.

In an ordinary analog circuit, the gate voltage of the cascode transistor is biased at a constant voltage, but in the CRCA, since the voltage (that is, the input voltage) of the source of the input transistor 322 fluctuates, it is necessary to bias with a voltage following the fluctuation. Therefore, as illustrated in the drawing, the cascode capacitance 331 is connected between the vertical signal line 259-$n$ and the gate of the cascode transistor 332, and the cascode side auto zero switch 333 is closed at a time of auto zero. As a result, the gate voltage of the cascode transistor can be interlocked with the vertical signal line 259-$n$. The current reuse column amplifier 320 illustrated in the drawing is hereinafter referred to as "cascode (C)-CRCA".

As described above, the first modification of the first embodiment of the present technology can improve the linearity of the output voltage with respect to the input voltage since the cascode transistor 332 is inserted, in which a voltage corresponding to the input voltage is applied to the gate of the cascode transistor 332.

[Second Modification]

In the first modification of the first embodiment described above, the cascode transistor 332 is inserted between the drain of the input transistor 322 and the base side current source transistor 327 (load MOS). However, in the C-CRCA, an output range becomes narrow, which is problematic. The current reuse column amplifier 320 according to a second modification of the first embodiment is different from the current reuse column amplifier 320 according to the first modification of the first embodiment in that the output range is expanded by a folded stage.

Figure 9:
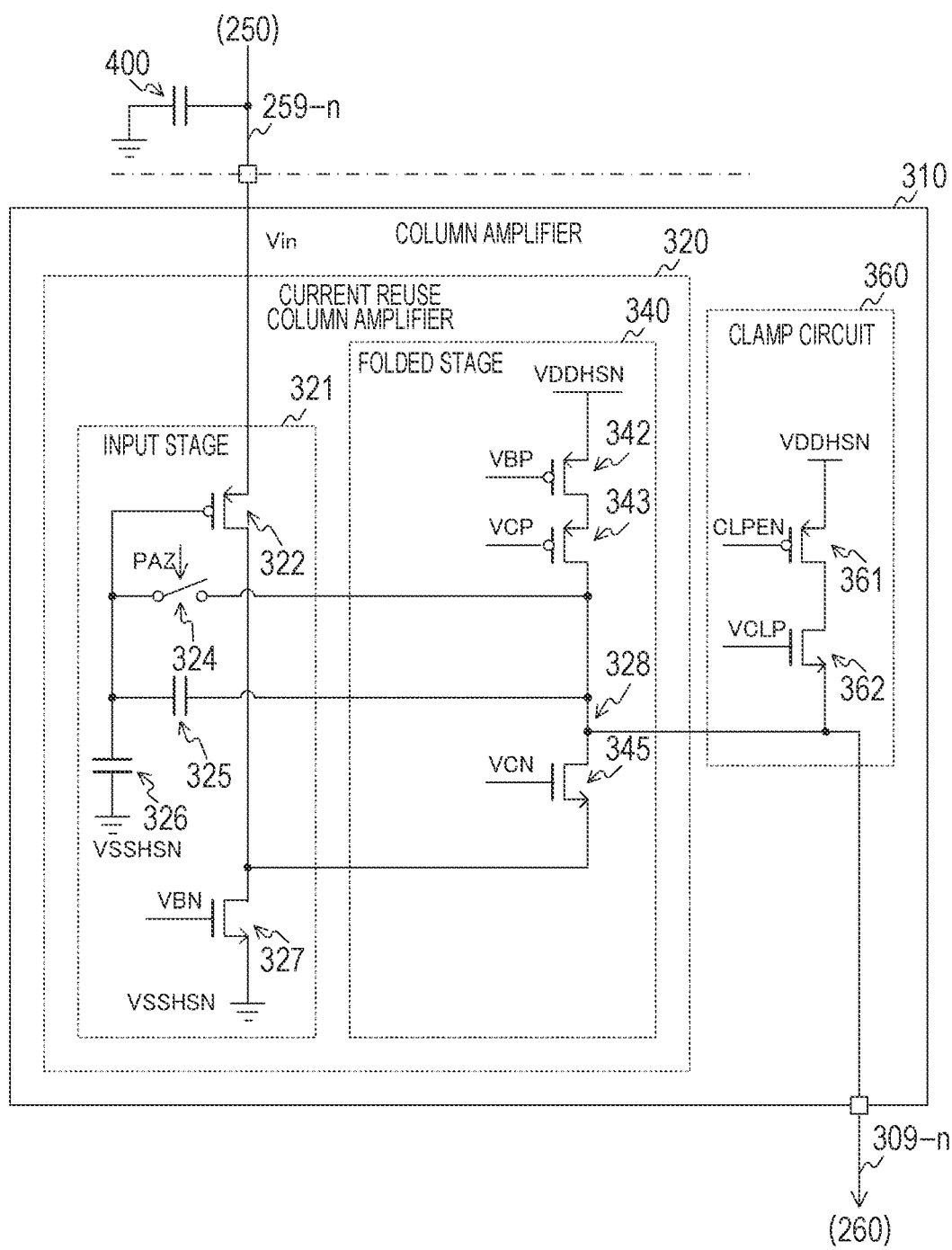
FIG. 9 is a circuit diagram depicting a configuration example of a column amplifier according to a second modification of the first embodiment of the present technology.

FIG. 9 is a circuit diagram depicting a configuration example of the column amplifier 310 according to the second modification of the first embodiment of the present technology. The current reuse column amplifier 320 according to the second modification of the first embodiment includes an input stage 321 and a folded stage 340. In the input stage 321, the input transistor 322, the input side auto zero switch 324, the feedback capacitance 325, the base side capacitance 326, and the base side current source transistor 327 are disposed. A connection configuration of the input transistor 322, the base side capacitance 326, and the base side current source transistor 327 is similar to a connection configuration of the first embodiment.

Furthermore, in the folded stage, a power supply side current source transistor 342 and cascode transistors 343 and 345 are disposed. A pMOS transistor is used as the power supply side current source transistor 342 and the cascode transistor 343, and an nMOS transistor is used as the cascode transistor 345.

The power supply side current source transistor 342 and the cascode transistor 343 are connected in series to a power supply node of the power supply voltage VDDHSN. Furthermore, a bias voltage VBP is applied to a gate of the power supply side current source transistor 342, and a bias voltage VCP is applied to a gate of the cascode transistor 343.

The cascode transistor 345 is inserted between the cascode transistor 343 and the base side current source transistor 327. Furthermore, a bias voltage VCN determined in advance is applied to a gate of the cascode transistor 345.

In addition, a node between the cascode transistors 343 and 345 is used as the output node 328. The input side auto zero switch 324 opens and closes a path between the input transistor 322 and the output node 328, and the feedback capacitance 325 is inserted between the input transistor 322 and the output node 328.

The current reuse column amplifier 320 illustrated in the drawing is hereinafter referred to as "folded cascode (FC)-CRCA". In this FC-CRCA, a current flowing through the folded stage 340 is added, but this current can be reduced as compared with the current of the input stage 321. Since input conversion noise of the power supply side current source transistor 342 also becomes smaller as the current is reduced, it is better to reduce the current. In the FC-CRCA according to the second modification of the first embodiment, an output range can be expanded by 1 $V_{GS}$ as compared with the C-CRCA according to the first modification of the first embodiment.

As described above, in the second modification of the first embodiment of the present technology, since the cascode transistors 343 and 345 are added, the output range can be expanded as compared with the first modification of the first embodiment in which only the cascode transistor 332 is provided.

[Third Modification]

In the second modification of the first embodiment described above, the cascode transistors 343 and 345. However, there is a possibility that the output range is insufficient in this configuration. The column amplifier 310 according to a third modification of the first embodiment is different from the column amplifier 310 according to the second modification of the first embodiment in that a reference voltage is applied to the feedback capacitance 325 to enlarge the output range at the time of auto zero.

Figure 10:
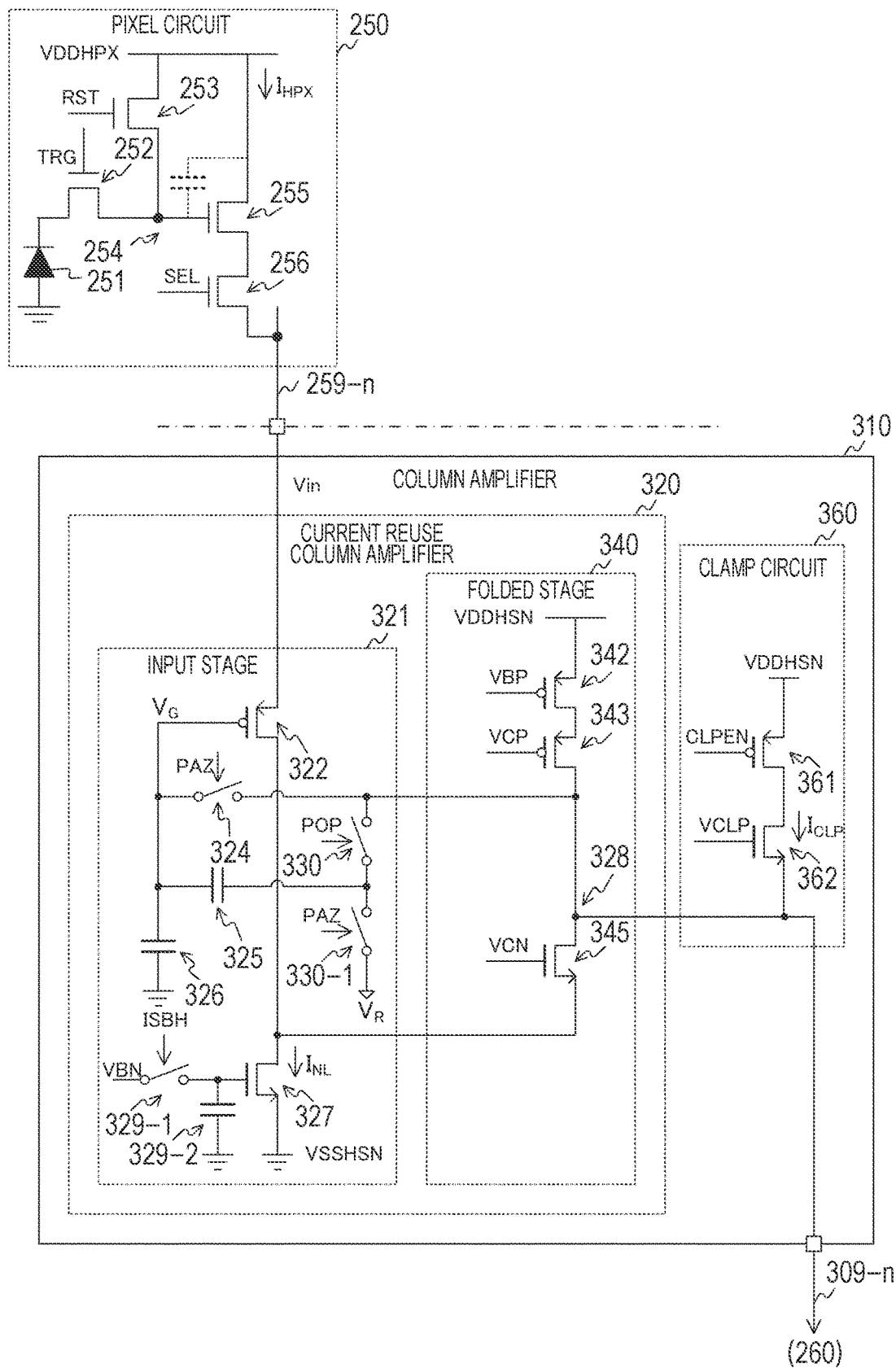
FIG. 10 is a circuit diagram depicting a configuration example of a column amplifier according to a third modification of the first embodiment of the present technology.

FIG. 10 is a circuit diagram depicting a configuration example of the column amplifier 310 according to the third modification of the first embodiment of the present technology. The current reuse column amplifier 320 according to the third modification of the first embodiment is different from the current reuse column amplifier 320 according to the second modification of the first embodiment in that an intermediate switch 330 and a reference switch 330-1 are further included. In addition, one end of the feedback capacitance 325 is connected not to the output node 328 but to a node between the intermediate switch 330 and the reference switch 330-1.

The intermediate switch 330 opens and closes a path between the output node 328 and one end of the feedback capacitance 325 in accordance with a control signal POP. The reference switch 330-1 opens and closes a path between one end of the feedback capacitance 325 and a node of a predetermined reference voltage $V_R$ in accordance with the auto zero signal PAZ.

In the configuration illustrated in the drawing, the timing control circuit 230 closes the input side auto zero switch 324 and the reference switch 330-1 and opens the intermediate switch 330 at the time of auto zero. As a result, a zero voltage as an output voltage at the time of auto zero can be determined independently of the vertical signal line. The reference voltage $V_R$ is set to such a high voltage that the power supply side current source transistor 342 and the cascode transistor 343 do not enter the linear region. Therefore, the output range can be used maximally.

A capacitance 329-2 is inserted between the gate of the base side current source transistor 327 and the base node. A sample and hold switch 329-1 applies the bias voltage VBN to the capacitance 329-2 and the gate of the base side current source transistor 327 in accordance with a control signal ISBH from the timing control circuit 230.

For example, the sample and hold switch 329-1 is controlled to be closed at the time of auto zero by the control signal ISBH. Note that the sample and hold switch 329-1 and the capacitance 329-2 are provided as necessary.

Furthermore, in the drawing, a gate voltage of the input transistor 322 is referred to as $V_G$. In addition, the current supplied by the base side current source transistor 327 is referred to as $I_{NL}$, and the current flowing between a drain and a source of the clamp transistor 362 during operation is referred to as a clamp current $I_{CLP}$. In addition, a current flowing from the power supply voltage VDDHPX of the pixel circuit 250 is referred to as $I_{HPX}$.

Figure 11:
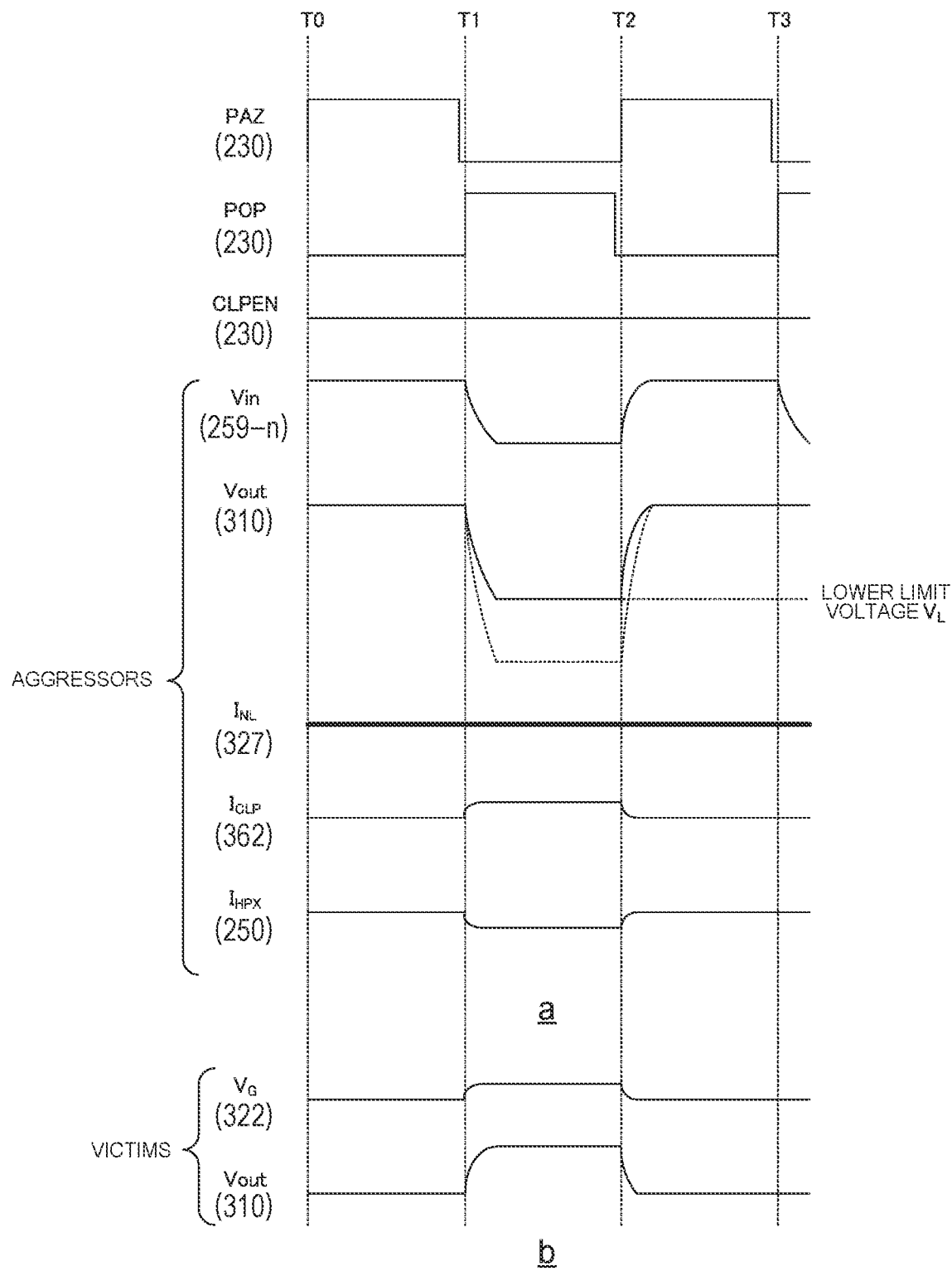
FIG. 11 is a timing chart depicting an example of operation of a solid-state imaging element according to the third modification of the first embodiment of the present technology.

FIG. 11 is a timing chart depicting an example of operation of a solid-state imaging element 200 according to the third modification of the first embodiment of the present technology. In the drawing, a is a timing chart of aggressors, and b is a timing chart of victims.

As illustrated in a of the drawing, a reset level of a certain row is subjected to AD conversion within a period from timing T0 to T1. Here, the reset level indicates a level (input voltage Vin) of the pixel signal when the floating diffusion layer 254 is initialized. Furthermore, a signal level of the row is subjected to AD conversion within the period from timings T1 to T2. Here, the signal level indicates a level (input voltage Vin) of the pixel signal immediately after the electric charges are transferred to the floating diffusion layer 254. Within the period from timing T2 to T3, the reset level of the next row is subjected to AD conversion. Similarly, the reset level and the signal level are sequentially subjected to AD conversion for every row.

The timing control circuit 230 supplies the high-level auto zero signal PAZ within a period from timing T0 to immediately before timing T1. In addition, the timing control circuit 230 supplies the low-level control signal POP within the period from timing T0 to T1. The input voltage Vin of the vertical signal line 259-n in this period is treated as the reset level. The reset level is amplified and output from the column amplifier 310 as the output voltage Vout.

Next, the timing control circuit 230 supplies the low-level auto zero signal PAZ within a period from timing T1 to immediately before timing T2. In addition, the timing control circuit 230 supplies the high-level control signal POP within the period from timing T1 to immediately before T2. The input voltage Vin of the vertical signal line 259-n decreases to the signal level, and the output voltage Vout also decreases. However, the output voltage Vout is limited to a value higher than the lower limit voltage $V_L$ by the clamp circuit 360.

In the comparative example without the clamp circuit 360, when strong light is incident, the output voltage Vout may decrease to the lower limit voltage $V_L$ or less. A dotted curve in the drawing indicates fluctuation of the output voltage Vout of the comparative example when strong light is incident.

Since the clamp circuit 360 limits the output voltage Vout to a value higher than the lower limit voltage $V_L$, the base side current source transistor 327 can operate in the saturation region even when strong light is incident. Therefore, the current $I_{NL}$ supplied from the base side current source transistor 327 becomes constant. As a result, streaking can be suppressed.

However, it should be noted that when the clamp current $I_{CLP}$ flows through the clamp transistor 362 by the clamp operation within a conversion period of the signal level from timing T1 to T2, the current $I_{HPX}$ from the power supply voltage VDDHPX decreases accordingly. As the current $I_{HPX}$ decreases, an IR drop of the power supply voltage VDDHPX fluctuates.

In particular, in a case where the capacitance of the floating diffusion layer 254 is relatively small or in a case where the parasitic capacitance of the amplification transistor 255 is relatively large, an influence of the fluctuation of the IR drop becomes large, and the voltage of the floating diffusion layer 254 of the victim increases via the parasitic capacitance.

As illustrated in b of the drawing, the increase in the voltage of the floating diffusion layer 254 of the victim via the parasitic capacitance increases the gate voltage $V_G$ of the input transistor 322 of the victim. In response to this increase, the output voltage Vout of the victim increases and deviates from the original level. In this manner, in a case where the capacitance of the floating diffusion layer 254 is relatively small or in a case where the parasitic capacitance of the amplification transistor 255 is relatively large, there is a possibility that streaking occurs. This problem can be solved by the current mirror circuit as described later.

After timing T2, similar control is repeatedly executed for each row. The enable signal CLPEN is set to a high level (valid) over a conversion period of the reset level and the signal level.

Figure 12:
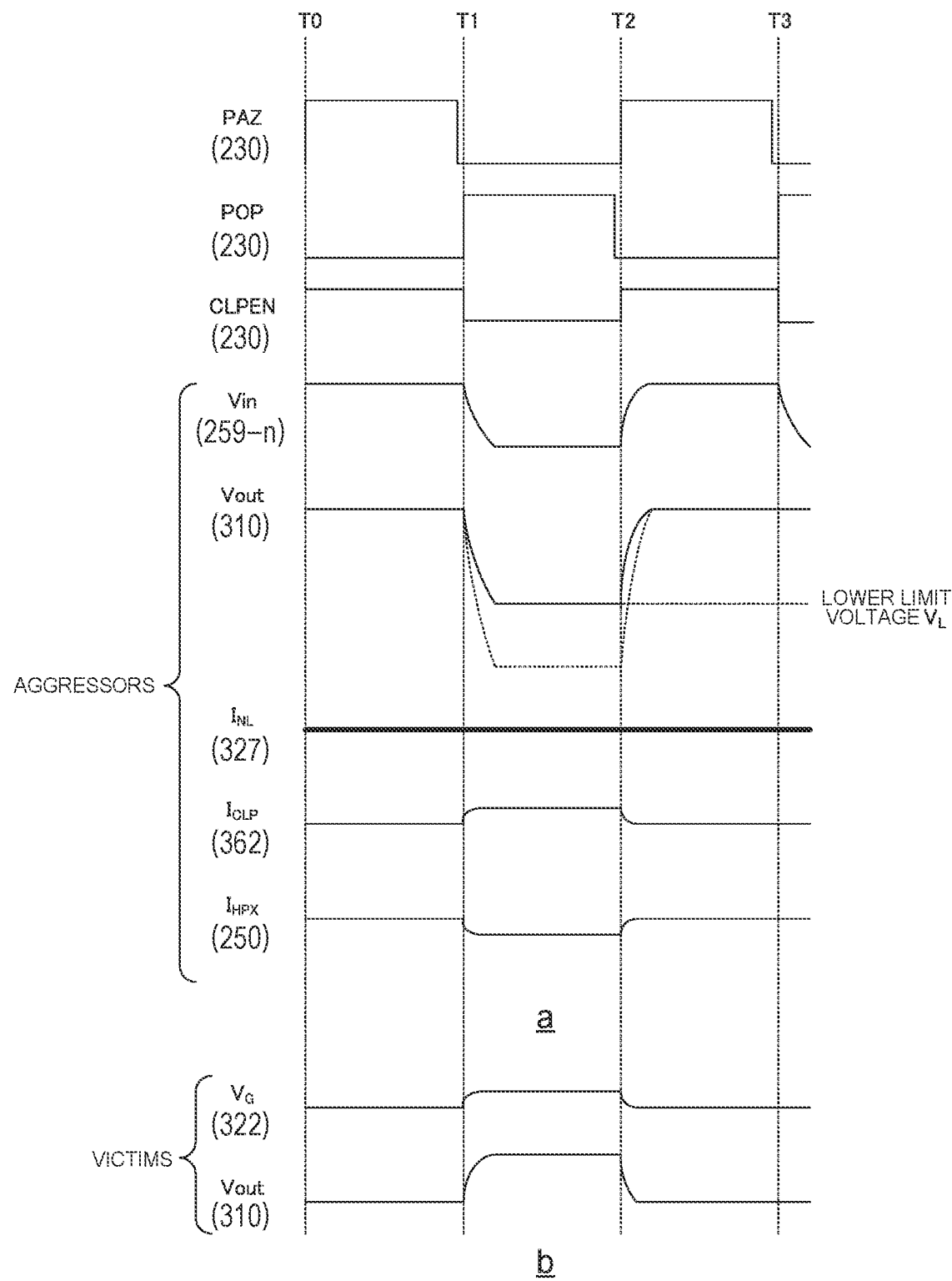
FIG. 12 is a timing chart depicting another example of the operation of the solid-state imaging element according to the third modification of the first embodiment of the present technology.

Note that, as illustrated in FIG. 12, the timing control circuit 230 can set the enable signal CLPEN to a low level (valid) only in the conversion period of the signal level (such as the period from timing T1 to T2), and set the enable signal CLPEN to a high level (invalid) in the other periods. Here, in a solid-state imaging element, a phenomenon is known in which, when light with significantly high illuminance enters a pixel, electric charges leak from a photoelectric conversion element in the pixel during a reset operation, luminance decreases, and the pixel sinks black. This phenomenon is called a sunspot phenomenon because a black spot such as a sunspot appears in image data although no sunspot actually occurs. As illustrated in the drawing, by setting the enable signal CLPEN to a low level (valid) and performing the clamp operation only in the conversion period of the signal level, the clamp operation can be normally performed even at a level where the sunspot phenomenon occurs.

As described above, in the third modification of the first embodiment of the present technology, since the reference switch 330-1 that connects the node of the reference voltage $V_R$ to one end of the feedback capacitance 325 at the time of auto zero is added, it is possible to enlarge the output range by setting the zero voltage to a voltage corresponding to the reference voltage $V_R$.

[Fourth Modification]

In the second modification of the first embodiment described above, the input side auto zero switch 324 opens and closes the path between the input transistor 322 and the output node 328. However, in this configuration, the zero voltage of the output decreases by 1 $V_{GS}$ from the vertical signal line at the time of auto zero. The current reuse column amplifier 320 according to a fourth modification of the first embodiment is different from the current reuse column amplifier 320 according to the second modification of the first embodiment in that auto zero is individually performed in the input stage 321 and the folded stage 340, and a switch is inserted between the input stage 321 and the folded stage 340 to suppress a decrease in the zero voltage.

Figure 13:
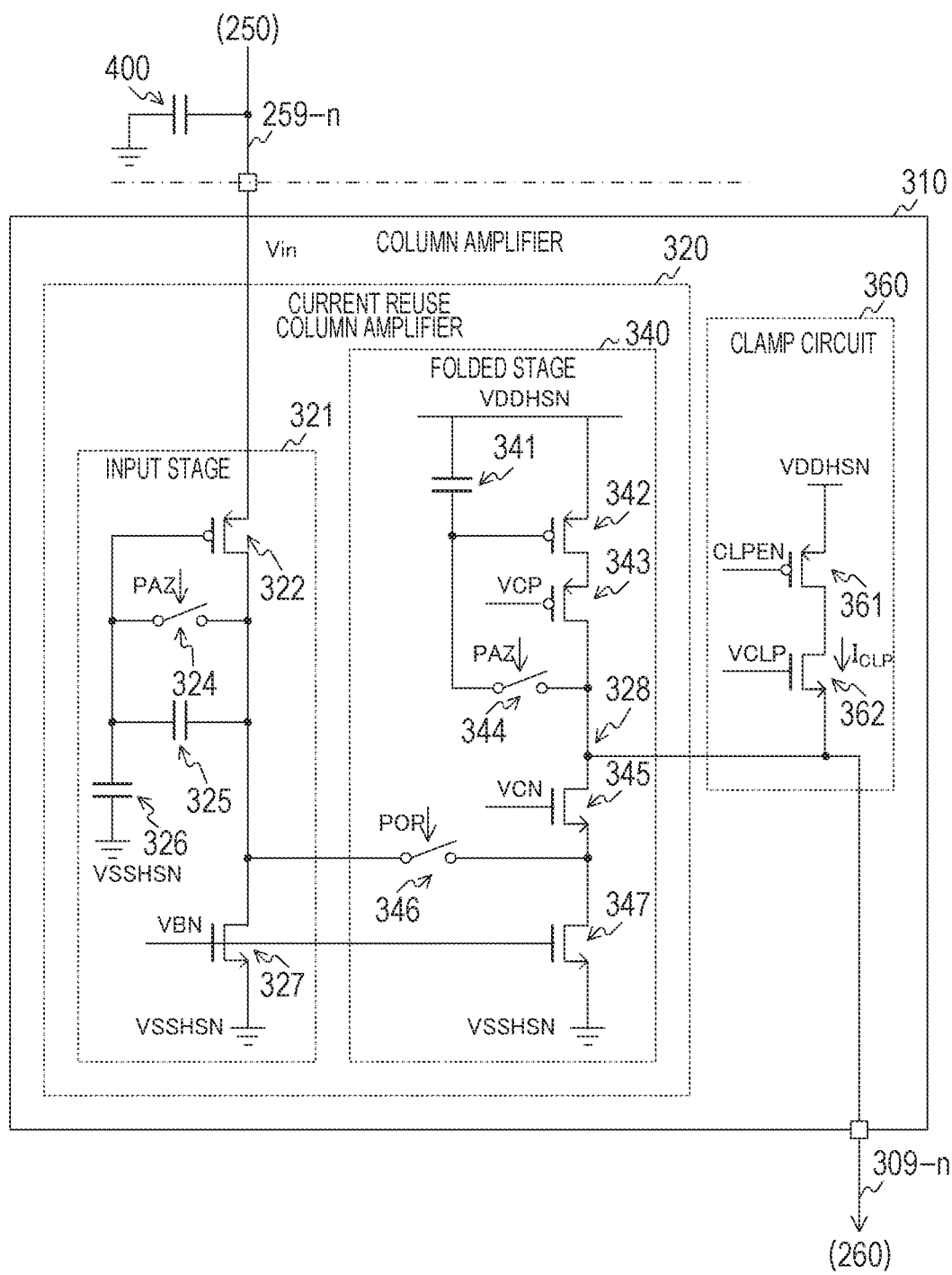
FIG. 13 is a circuit diagram depicting a configuration example of a column amplifier according to a fourth modification of the first embodiment of the present technology.

FIG. 13 is a circuit diagram depicting a configuration example of the column amplifier 310 according to the fourth modification of the first embodiment of the present technology. The current reuse column amplifier 320 according to the fourth modification of the first embodiment is different from the current reuse column amplifier 320 according to a third embodiment in that a cascode capacitance 341, an output side auto zero switch 344, an intermediate switch 346, and a base side current source transistor 347 are further included. As the base side current source transistor 347, an nMOS transistor is used. Furthermore, a connection configuration of each element in the input stage 321 of the fourth modification of the first embodiment is similar to the connection configuration of the first embodiment.

Furthermore, the cascode capacitance 341 is inserted between a power supply node of a predetermined power supply voltage and the output side auto zero switch 344. The gate of the power supply side current source transistor 342 is connected to a node between the cascode capacitance 341 and the output side auto zero switch 344.

Furthermore, the base side current source transistor 347 is inserted between the cascode transistor 345 and the base node. The same bias voltage VBN as the base side current source transistor 327 is applied to a gate of the base side current source transistor 347.

The intermediate switch 346 opens and closes a path between a node between the input transistor 322 and the base side current source transistor 327 and a node between the cascode transistor 345 and the base side current source transistor 347 in accordance with the control signal POP.

Furthermore, the output side auto zero switch 344 opens and closes a path between the cascode capacitance 341 and the output node 328 in accordance with the auto zero signal PAZ.

The current reuse column amplifier 320 illustrated in the drawing is hereinafter referred to as "modified folded cascode (MFC)-CRCA".

In the configuration illustrated in the drawing, the input stage 321 and the folded stage 340 can be separated by the intermediate switch 346 at the time of autozeroing, and auto zero can be performed separately. In the input stage 321, the input side auto zero switch 324 performs auto zero by using an intermediate node. On the other hand, in the folded stage 340, the output side auto zero switch 344 short-circuits the gate of the power supply side current source transistor 342 and the output node 328. Then, the output zero voltage becomes a voltage decreased by 1 $V_{GS}$ from a power supply of the folded stage 340, and a voltage higher than the FC-CRCA according to the second modification of the first embodiment can be set to the zero voltage. As a result, the output range is enlarged. It should be noted that although there is one current source in the third modification of the first embodiment, there are two separate current sources (the base side current source transistors 327 and 347) in the fourth modification of the first embodiment, and thus an effect of the autozero is weakened to generate an offset. In particular, since a drain voltage of the input transistor 322 is lower during normal operation than during auto zero to be offset in a direction in which the output voltage increases. This offset is particularly large when the current of the folded stage 340 is reduced as compared to the input stage 321.

In addition, although the output range is greatly expanded, a maximum value of an input range is smaller by a saturation voltage of the input transistor 322 than in a case where only the load MOS is provided. In a case where the gain is multiplied by 1, the input range is narrower than in a case where only the load MOS is provided, and more noise also occurs. Thus, there is a possibility that a noise suppression effect at subsequent stages is lost.

As described above, in the fourth modification of the first embodiment of the present technology, the intermediate switch 346 separates the input stage 321 and the folded stage 340 at the time of auto zero, and performs auto zero individually. It is therefore possible to increase the zero voltage and enlarge the output range as compared with in a case where the input stage 321 and the folded stage 340 are not separated.

[Fifth Modification]

In the first embodiment described above, since the gain is higher than in a case where only the load MOS is provided, a substantial load capacitance viewed from a pixel amplifier increases, and settling deteriorates.

The column amplifier 310 according to a fifth modification of the first embodiment is different from the column amplifier 310 according to the first embodiment in that a load capacitance is reduced by adding a boost circuit 350.

Figure 14:
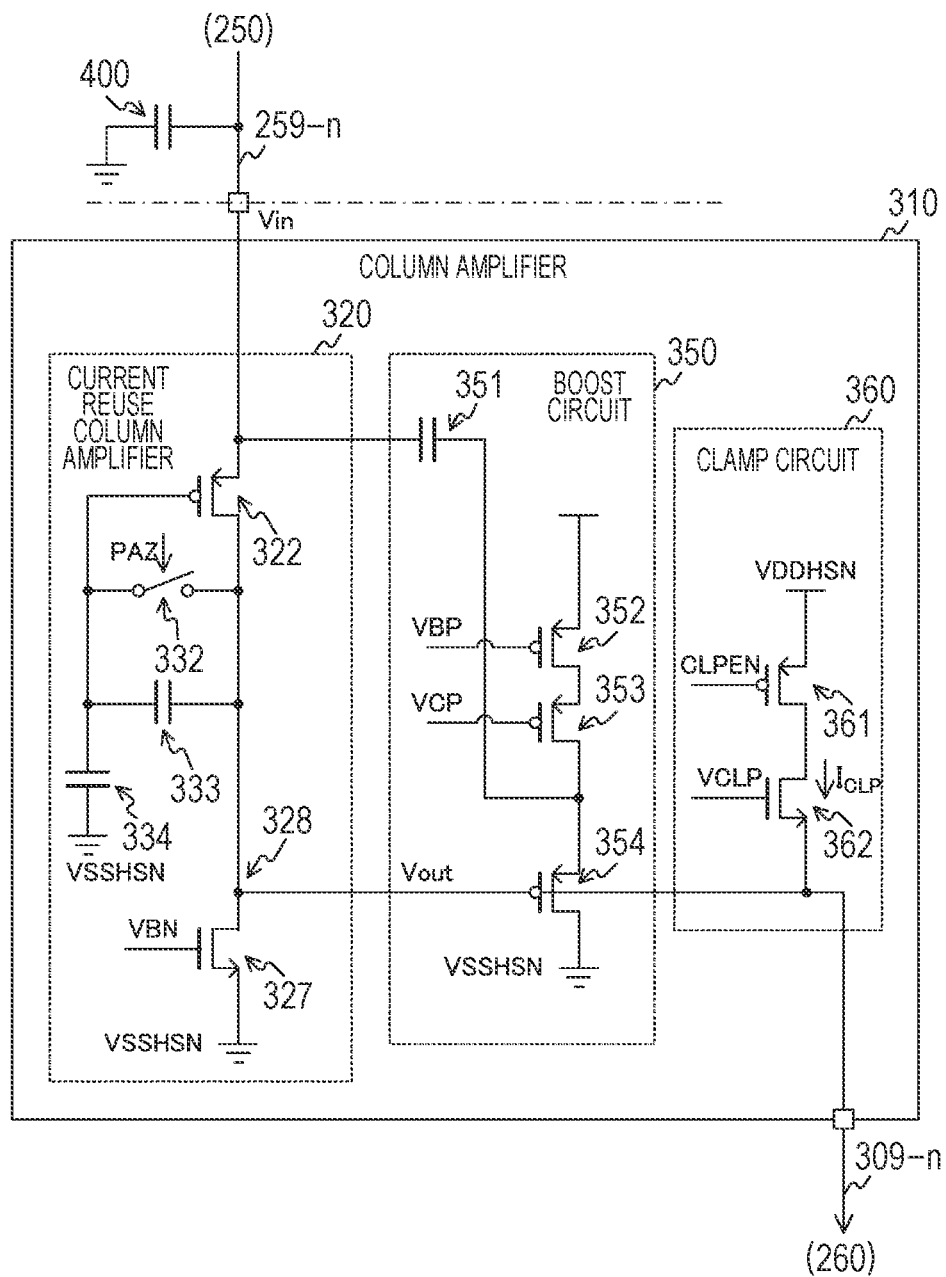
FIG. 14 is a circuit diagram depicting a configuration example of a column amplifier according to a fifth modification of the first embodiment of the present technology.

FIG. 14 is a circuit diagram depicting a configuration example of the column amplifier 310 according to the fifth modification of the first embodiment of the present technology. The column amplifier 310 according to the fifth modification of the first embodiment is different from the column amplifier 310 according to the first embodiment in that the boost circuit 350 is further included in addition to the current reuse column amplifier 320. In the boost circuit 350, a boost side capacitance 351, a boost side current source transistor 352, a cascode transistor 353, and a boost transistor 354 are disposed. As the boost side current source transistor 352, the cascode transistor 353, and the boost transistor 354, pMOS transistors are used.

The boost side current source transistor 352, the cascode transistor 353, and the boost transistor 354 are inserted in series between the power supply node and the base node. A bias voltage VBP determined in advance is applied to a gate of the boost side current source transistor 352, and a bias voltage VCP determined in advance is applied to a gate of the cascode transistor 353. A gate of the boost transistor 354 is connected to the output node 328.

Furthermore, the boost side capacitance 351 is inserted between the vertical signal line 259-$n$ and a node between the cascode transistor 353 and the boost transistor 354.

The configuration in the drawing allows the output voltage Vout to be buffered by using the source follower of the boost transistor 354 and to be coupled to the vertical signal line 259-$n$ by capacitance. For example, when the gain is eight times, an amount of voltage decrease of the output voltage Vout is eight times as large as an amount of voltage decrease of the vertical signal line 259-$n$, a voltage fluctuation seven times as large as a difference between the amounts occurs in the boost side capacitance 351. Then, the current for charging the boost side capacitance 351 is extracted from the vertical signal line 259-$n$, and settling can be facilitated. This operation can be understood as if the vertical signal line 259-$n$ is provided with a negative ground capacitance seven times as large as the vertical signal line 259-$n$, and has an effect of practically reducing the load capacitance.

Here, the load capacitance on an output side is expressed by the following formula.

$$C_L + C_S // C_F \quad \text{Formula 3}$$

When a capacitance value of the boost side capacitance 351 is set to the same level as in Formula 3, it can be expected to cancel an entire virtual capacitance increased by the gain. However, it should be noted that when the gain is one, the voltage of the boost side capacitance 351 does not change and does not work at all.

In the fifth modification of the first embodiment, an additional branch current to the boost circuit 350 is required, but this current may be relatively small. In a case where there is a gain, the gate-source voltage $V_{GS}$ of the boost transistor 354 is applied, and a large current can flow to the base node. Furthermore, noise of the additional boost circuit 350 is filtered by the VSL capacitance 400, and does not appear in the output.

Figure 15:
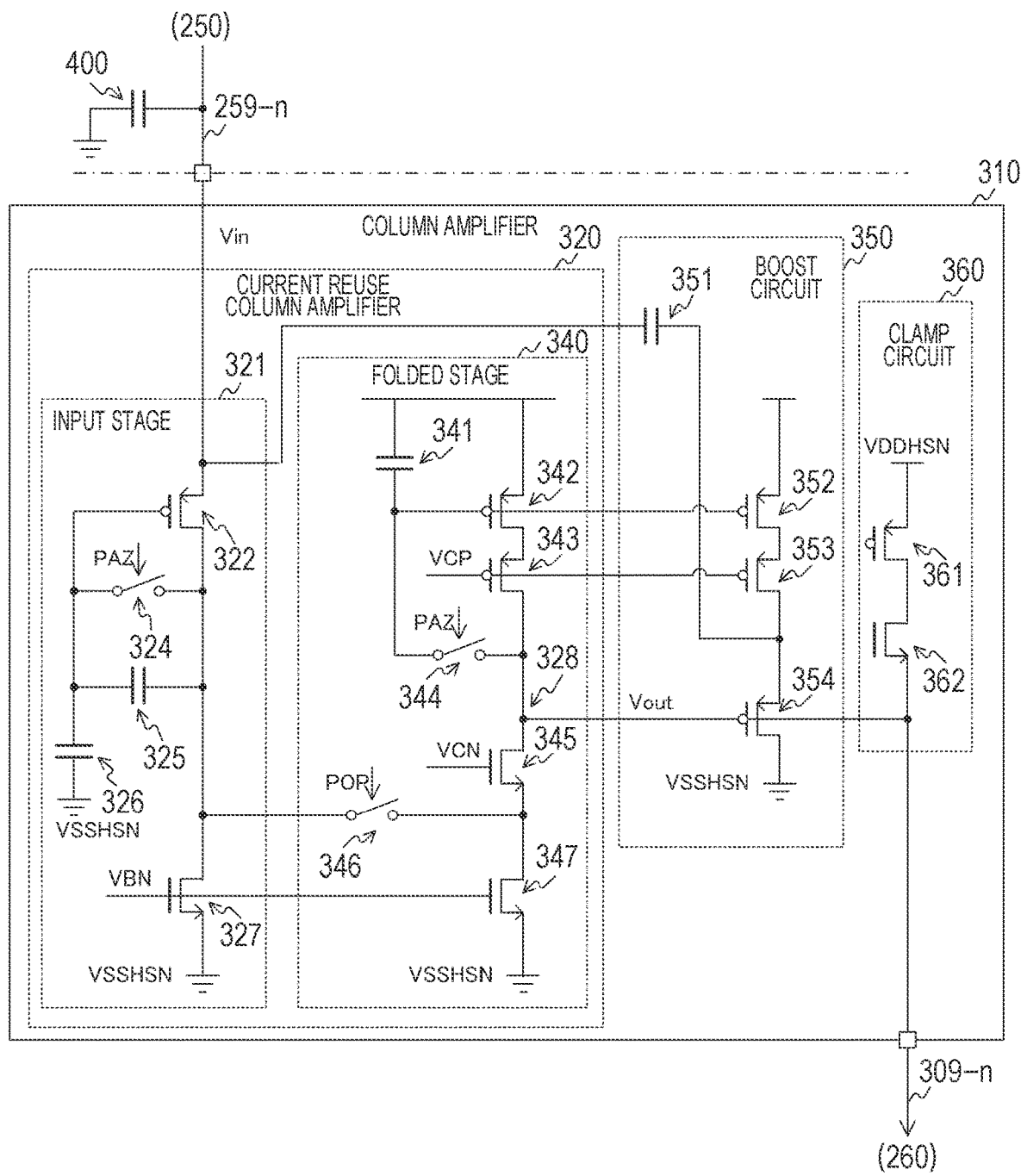
FIG. 15 is a circuit diagram depicting another example of the column amplifier according to the fifth modification of the first embodiment of the present technology.

Note that, although the boost circuit 350 is added to the CRCA according to the first embodiment, the boost circuit 350 can be added to the first to fourth modifications of the first embodiment. For example, as illustrated in FIG. 15, the boost circuit 350 can be added to the MFC-CRCA according to the fourth modification of the first embodiment.

As described above, in the fifth modification of the first embodiment of the present technology, the load capacitance is reduced by adding the boost circuit 350, and thus time required for settling can be reduced.

2. Second Embodiment

In the first embodiment described above, the power supply voltage VDDHSN on the side of the circuit chip 202 is supplied to the clamp circuit 360. However, in this configuration, there is a possibility that a fluctuation of the current $I_{HPX}$ on the side of the pixel chip 201 cannot be sufficiently suppressed. The column amplifier 310 according to a second embodiment is different from the column amplifier 310 according to the first embodiment in that the power supply voltage VDDHPX on the side of the pixel chip 201 is supplied to the clamp circuit 360.

Figure 16:
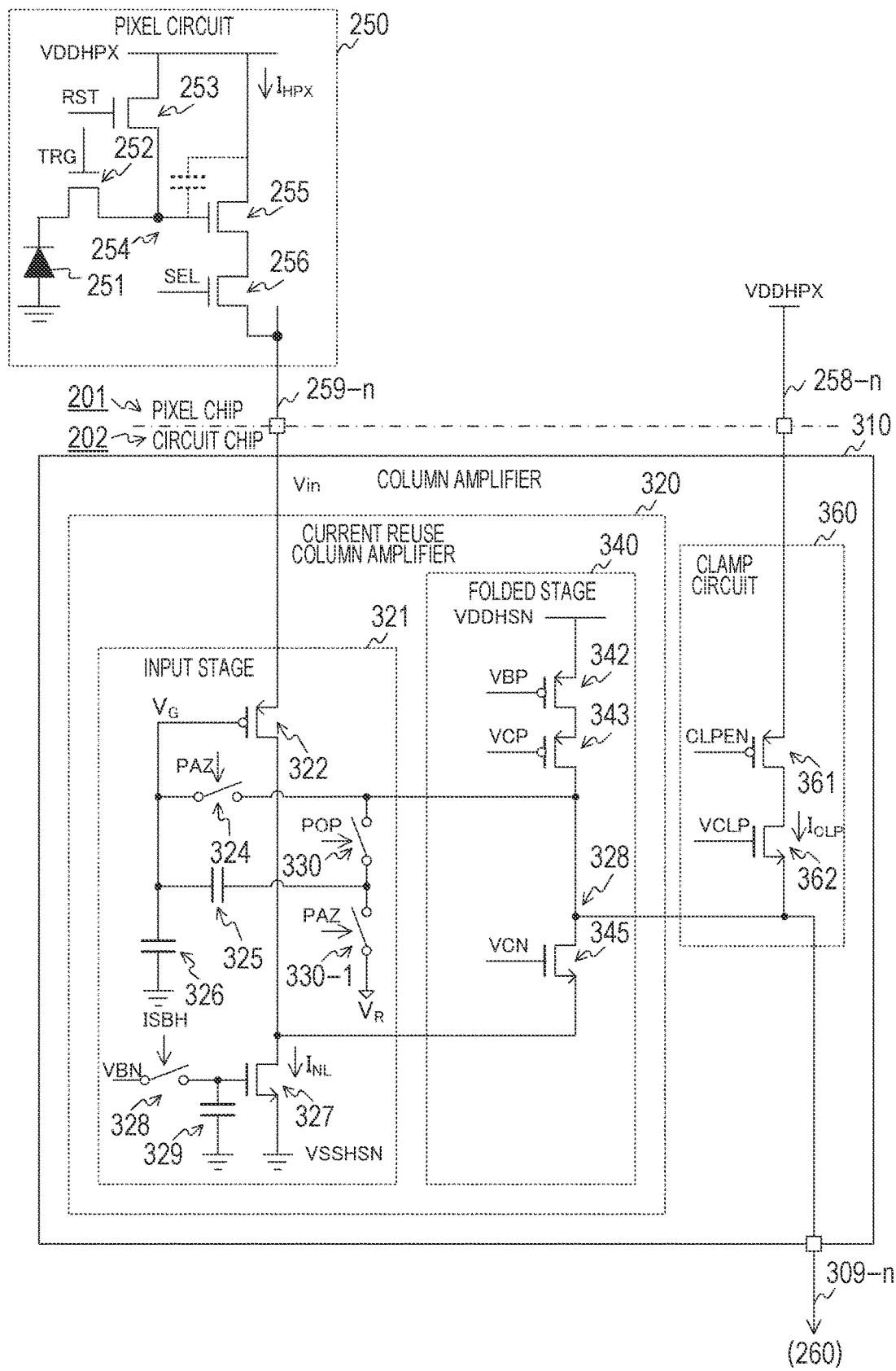
FIG. 16 is a circuit diagram depicting a configuration example of a column amplifier according to a second embodiment of the present technology.

FIG. 16 is a circuit diagram depicting a configuration example of the column amplifier 310 according to the second embodiment of the present technology. The column amplifier 310 according to a second embodiment is different from the column amplifier 310 according to the first embodiment in that the power supply voltage VDDHPX on the side of the pixel chip 201 is supplied to the clamp circuit 360. In addition, a circuit configuration of the current reuse column amplifier 320 according to the second embodiment is similar to a circuit configuration according to the third modification of the first embodiment illustrated in FIG. 10.

In the second embodiment, a signal line 258-$n$ is added for every column, and the power supply voltage VDDHPX is supplied to the clamp circuit 360 via the signal line 258-$n$. As illustrated in the drawing, in order to wire the signal lines 258-$n$ and 259-$n$ for every column, two connection portions between chips such as Cu—Cu bonding are required for every column. Note that the power supply voltage VDDHPX is an example of a pixel side power supply voltage described in the claims.

By setting the power supply voltage of the clamp circuit 360 to the power supply voltage VDDHPX on a pixel side, when the clamp current $I_{CLP}$ flows through the clamp transistor 362 at a time of the clamp operation, the current $I_{HPX}$ increases accordingly. As a result, the current $I_{HPX}$ can be made substantially constant, and the streaking caused by the fluctuation of the current $I_{HPX}$ can be reduced.

Note that the current reuse column amplifiers 320 according to the first embodiment and the first, second, fourth, and fifth modifications can be applied to the second embodiment.

As described above, in the second embodiment of the present technology, since the power supply voltage VDDHPX on the pixel side is supplied to the clamp circuit 360, when the clamp current $I_{CLP}$ flows through the clamp transistor 362 at the time of the clamp operation, the current $I_{HPX}$ increases accordingly. As a result, the decrease in the current $I_{HPX}$ flowing through the input stage 321 is canceled, the current $I_{HPX}$ becomes substantially constant, and the streaking occurring when the current $I_{HPX}$ fluctuates can be reduced.

3. Third Embodiment

In the second embodiment described above, the power supply voltage VDDHPX on the pixel side is supplied to the clamp circuit 360. However, in this configuration, the number of wirings for each column and the connection portion between chips increase, and miniaturization of pixels becomes difficult. The column amplifier 310 according to the third embodiment is different from the column amplifier 310 according to the second embodiment in that the current mirror circuit draws the clamp current $I_{CLP}$ by the clamp operation from the vertical signal line 259-$n$.

Figure 17:
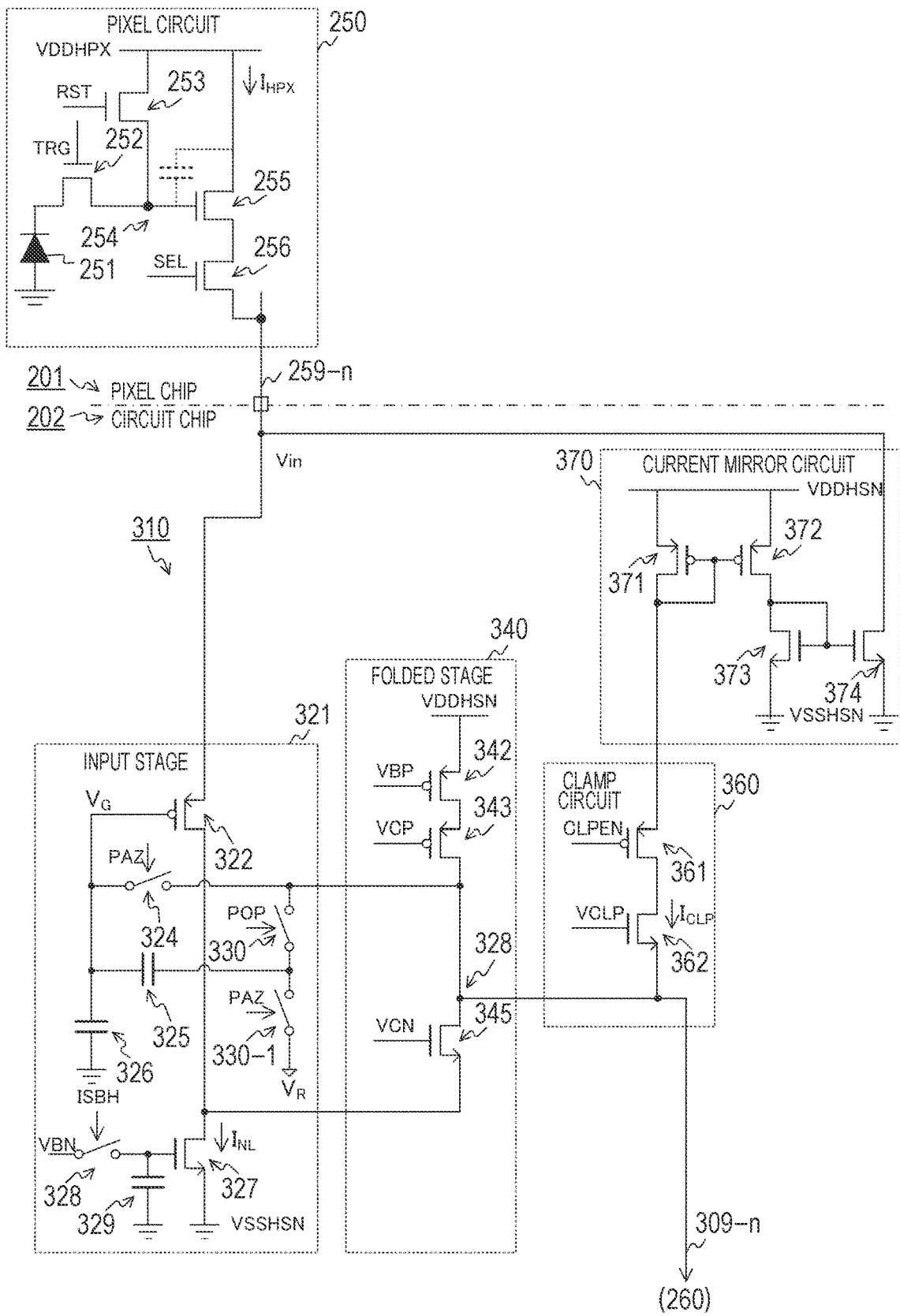
FIG. 17 is a circuit diagram depicting a configuration example of a column amplifier according to a third embodiment of the present technology.

FIG. 17 is a circuit diagram depicting a configuration example of the column amplifier 310 according to the third embodiment of the present technology. The column amplifier 310 according to the third embodiment is different from the column amplifier 310 according to the second embodiment in that a current mirror circuit 370 is further included.

The current mirror circuit 370 includes pMOS transistors 371 and 372 and nMOS transistors 373 and 374. The pMOS transistors 371 and 372 are connected in parallel to the node of the power supply voltage VDDHSN. A gate and a drain of the pMOS transistor 371 are short-circuited, and the drain of the pMOS transistor 371 is connected to the enable transistor 361 on the power supply side of the clamp circuit 360.

The nMOS transistors 373 and 374 are connected in parallel to the base node of the base voltage VSSHSN. A gate and a drain of the nMOS transistor 373 are short-circuited, and the drain of the nMOS transistor 373 is connected to a drain of the pMOS transistor 372. Furthermore, a drain of the nMOS transistor 374 is connected to the vertical signal line 259-$n$ via a branch node on the side of the circuit chip 202.

In the above connection configuration, the current mirror circuit 370 generates a mirror current corresponding to the clamp current $I_{CLP}$ generated at the time of the clamp operation, and causes the mirror current to flow from the vertical signal line 259-$n$ to the base node of the base voltage VSSHSN. In other words, the current mirror circuit 370 draws the mirror current from the vertical signal line 259-$n$. Since only the vertical signal line 259-$n$ is required to be wired for each column between the chips, it is easy to miniaturize the pixels as compared with the second embodiment in which two vertical signal lines are wired for each column. Note that the mirror ratio between the clamp current $I_{CLP}$ of a copy source and the mirror current of a copy destination only needs to be 1:1, and thus a mirror ratio of the pMOS transistors 371 and 372 and a mirror ratio of the nMOS transistors 373 and 374 are arbitrary and are not limited to 1:1.

Note that the current reuse column amplifiers 320 according to the first embodiment and the first, second, fourth, and fifth modifications can be applied to the third embodiment.

Figure 18:
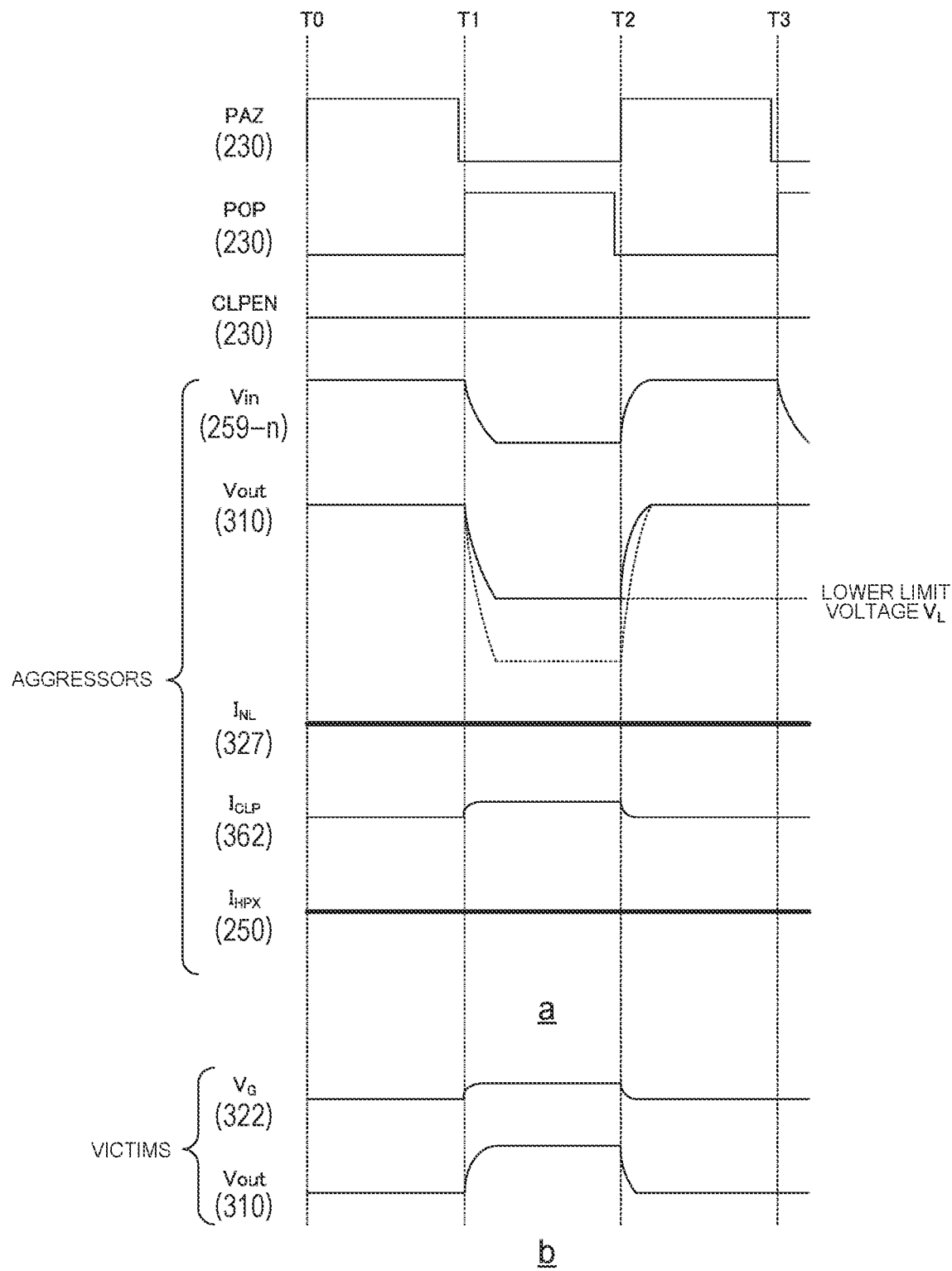
FIG. 18 is a timing chart depicting an example of operation of a solid-state imaging element according to the third embodiment of the present technology.

FIG. 18 is a timing chart depicting an example of the operation of the solid-state imaging element 200 according to the third embodiment of the present technology. In the drawing, a is a timing chart of aggressors, and b is a timing chart of victims.

As illustrated in a of the drawing, the clamp current $I_{CLP}$ increases due to the clamp operation in the conversion period of the signal level from timing T1 to T2. Since the current mirror circuit 370 draws the mirror current from the vertical signal line 259-$n$ by the increase in the clamp current $I_{CLP}$, the current $I_{HPX}$ of the pixel flowing through the signal line becomes substantially constant. It is therefore possible to suppress fluctuation in the IR drop of the power supply voltage VDDHPX on the pixel side.

However, it should be noted that the mirror current generated in the aggressor increases the IR drop of the base voltage VSSHSN on the circuit side. Due to this fluctuation of the IR drop, the gate voltage $V_G$ of the input transistor 322 of the victim rises as illustrated in b of the drawing. In response to this increase, there is a possibility that the output voltage Vout of the victim increases and deviates from the original level. As a result, streaking may not be sufficiently suppressed. A method for solving this problem will be described later in a fifth embodiment.

As described above, in the third embodiment of the present technology, since the current mirror circuit 370 causes the mirror current corresponding to the clamp current $I_{CLP}$ to flow through the vertical signal line 259-n, the current $I_{HPX}$ flowing through the signal line can be made substantially constant.

4. Fourth Embodiment

In the third embodiment described above, the current mirror circuit 370 draws the mirror current from the vertical signal line 259-n, but the mirror current can be also drawn directly from the power supply voltage VDDHPX. The column amplifier 310 according to a fourth embodiment is different from the column amplifier 310 according to the third embodiment in that the current mirror circuit 370 draws the mirror current from the power supply voltage VDDHPX.

Figure 19:
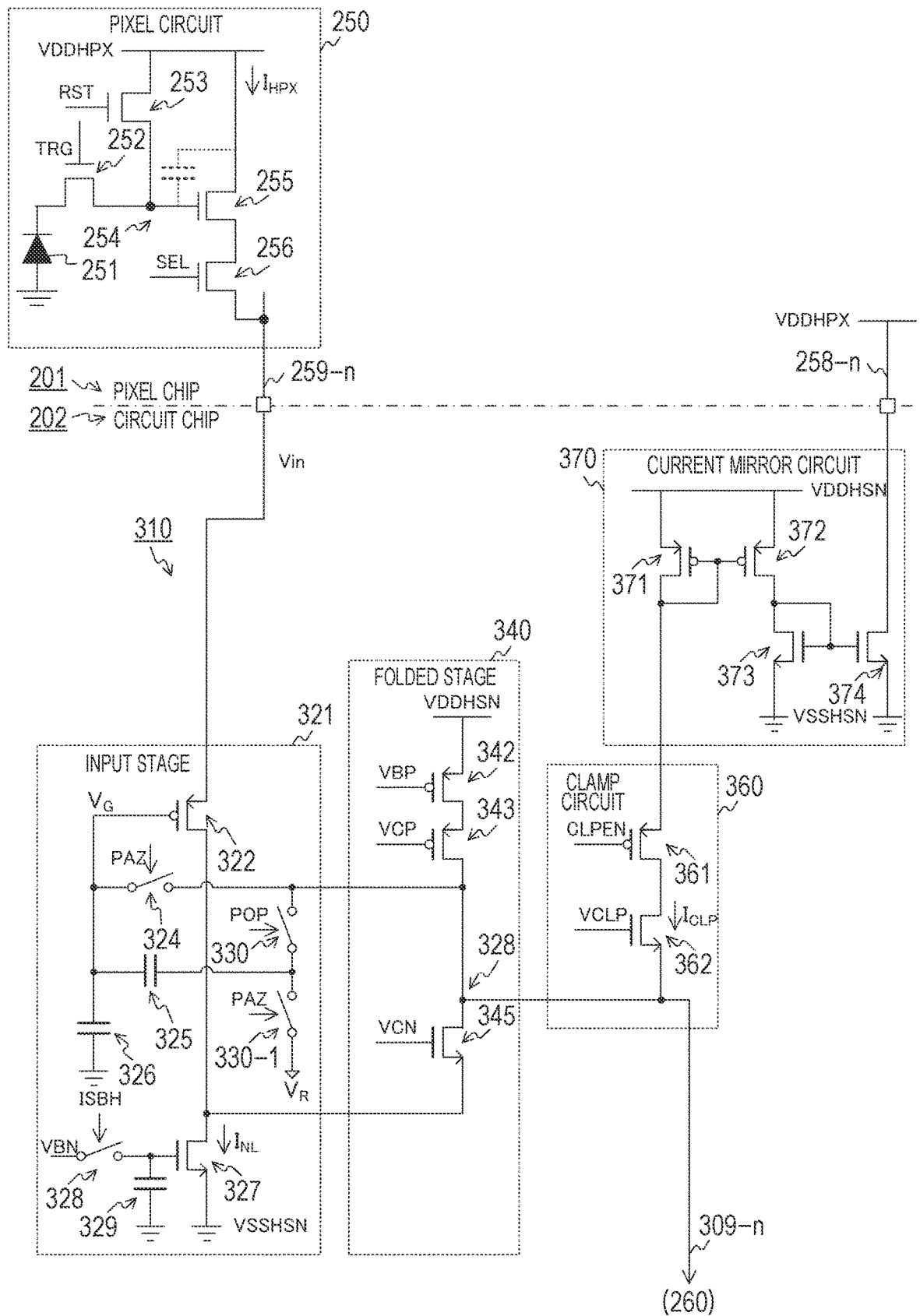
FIG. 19 is a circuit diagram depicting a configuration example of a column amplifier according to a fourth embodiment of the present technology.

FIG. 19 is a circuit diagram depicting a configuration example of the column amplifier 310 according to the fourth embodiment of the present technology. The column amplifier 310 according to the fourth embodiment is different from the column amplifier 310 according to the third embodiment in that the drain of the nMOS transistor 374 in the current mirror circuit 370 is connected to the node of the power supply voltage VDDHPX on the pixel side. This connection allows the current mirror circuit 370 to cause the mirror current to flow from the node of the power supply voltage VDDHPX to the base node of the base voltage VSSHSN via the signal line 258-n.

Note that the current reuse column amplifiers 320 according to the first embodiment and the first, second, fourth, and fifth modifications can be applied to the fourth embodiment.

As described above, in the fourth embodiment of the present technology, since the current mirror circuit 370 causes the mirror current to flow from the node of the power supply voltage VDDHPX to the base node of the base voltage VSSHSN, the current $I_{HPX}$ on the pixel side can be made substantially constant.

5. Fifth Embodiment

In the third embodiment described above, the current mirror circuit 370 causes the mirror current to flow to the base node of the base voltage VSSHSN. However, in this configuration, there is a possibility that the IR drop of the base voltage VSSHSN increases due to the mirror current. The column amplifier 310 according to the fifth embodiment is different from the column amplifier 310 according to the third embodiment in that the current mirror circuit 370 causes the mirror current to flow to a node of a base voltage different from the base voltage VSSHSN.

Figure 20:
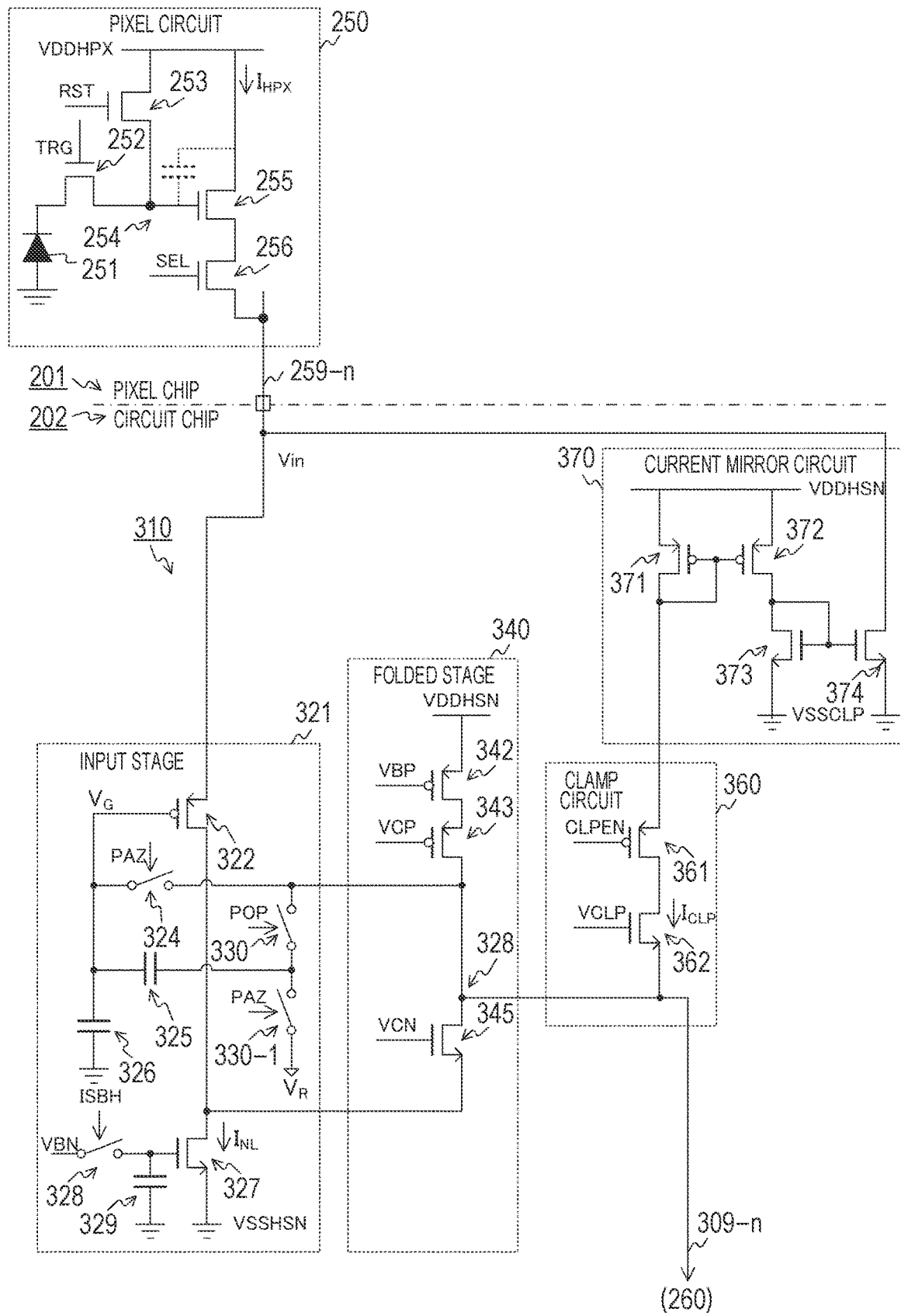
FIG. 20 is a circuit diagram depicting a configuration example of a column amplifier according to a fifth embodiment of the present technology.

FIG. 20 is a circuit diagram depicting a configuration example of the column amplifier 310 according to the fifth embodiment of the present technology. The column amplifier 310 according to the fifth embodiment is different from the column amplifier 310 according to the third embodiment in that the nMOS transistors 373 and 374 in the current mirror circuit 370 is connected in parallel to a base node of the base voltage VSSCLP. This connection allows the current mirror circuit 370 to cause the mirror current to flow to the base node of the base voltage VSSCLP.

The base voltage VSSCLP is a voltage different from the base voltage VSSHSN of the input stage 321. Note that the base voltage VSSHSN is an example of a first base voltage described in the claims, and the base voltage VSSCLP is an example of a second base voltage described in the claims.

Note that the current reuse column amplifiers 320 according to the first embodiment and the first, second, fourth, and fifth modifications can be applied to the fifth embodiment.

Figure 21:
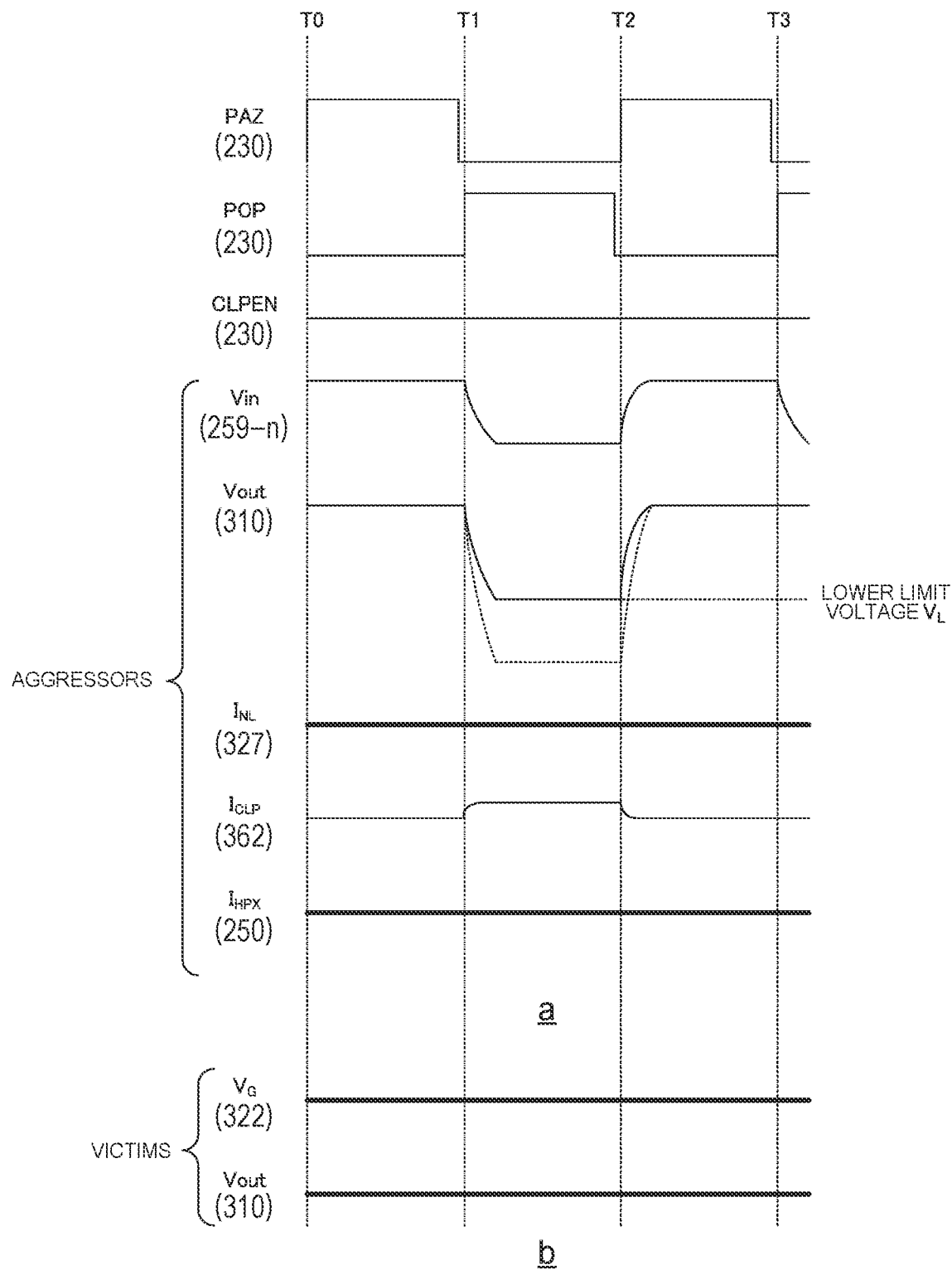
FIG. 21 is a timing chart depicting an example of operation of a solid-state imaging element according to the fifth embodiment of the present technology.

FIG. 21 is a timing chart depicting an example of the operation of the solid-state imaging element 200 according to the fifth embodiment of the present technology. In the drawing, a is a timing chart of aggressors, and b is a timing chart of victims.

As illustrated in a of the drawing, the clamp current $I_{CLP}$ increases due to the clamp operation in the conversion period of the signal level from timing T1 to T2. Since the current mirror circuit 370 draws the current from the vertical signal line 259-n by the increase in the clamp current $I_{CLP}$, the current $I_{HPX}$ flowing through the signal line becomes substantially constant. It is therefore possible to suppress fluctuation in the IR drop of the power supply voltage VDDHPX on the pixel side.

In addition, since the base voltage of the clamp circuit 360 is changed to VSSCLP, fluctuation of the IR drop of the base voltage VSSHSN on the circuit side can be suppressed.

By suppressing the fluctuation of the IR drop on the circuit side, it is possible to suppress the fluctuation of the gate voltage $V_G$ and the output voltage Vout of the victim as illustrated in b of the drawing. As a result, streaking can be sufficiently suppressed.

Figure 22:
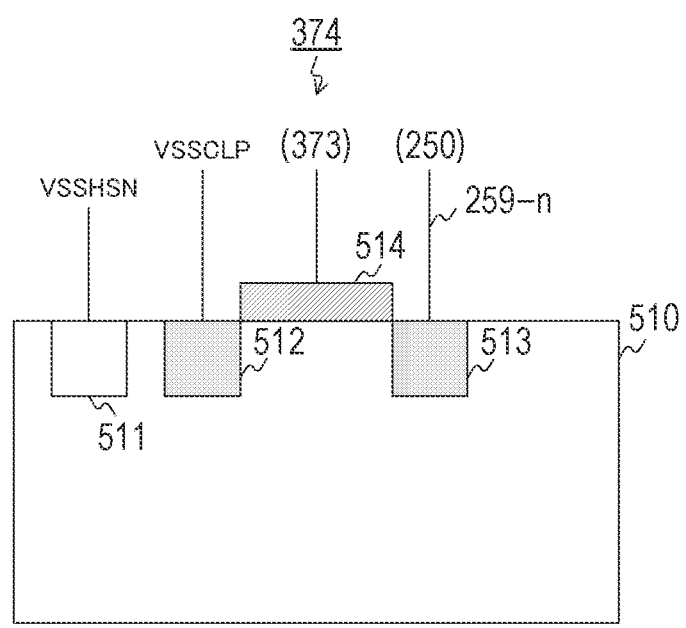
FIG. 22 is a diagram depicting an example of a sectional view of an n-channel metal oxide semiconductor (nMOS) transistor according to the fifth embodiment of the present technology.

FIG. 22 is a diagram depicting an example of a sectional view of the nMOS transistor 374 according to the fifth embodiment of the present technology. A P layer 511 and N layers 512 and 513 are formed in a P well 510. A metal gate electrode 514 is formed between the N layers 512 and 513 with an oxide film (not illustrated) interposed therebetween.

The P layer 511 is connected to the base node of the base voltage VSSHSN. On the other hand, the N layer 512 corresponds to a source of the nMOS transistor 374 and is connected to the base node of the base voltage VSSCLP. The gate electrode 514 corresponds to a gate of the nMOS transistor 374 and is connected to the nMOS transistor 373. The N layer 512 corresponds to the drain of the nMOS transistor 374 and is connected to the pixel circuit 250 via the vertical signal line 259-n.

As illustrated in the drawing, the P well 510 is not required to be divided, and the voltage of the P well 510 may be either the base voltage VSSCLP or the base voltage VSSHSN.

Figure 23:
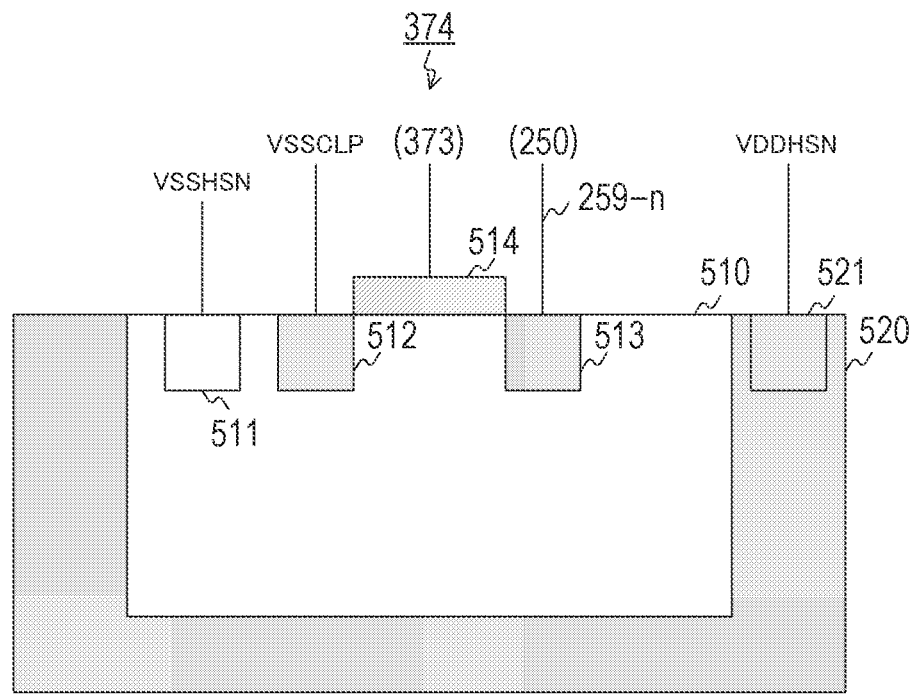
FIG. 23 is a diagram depicting another example of the sectional view of the nMOS transistor according to the fifth embodiment of the present technology.
Figure 23:
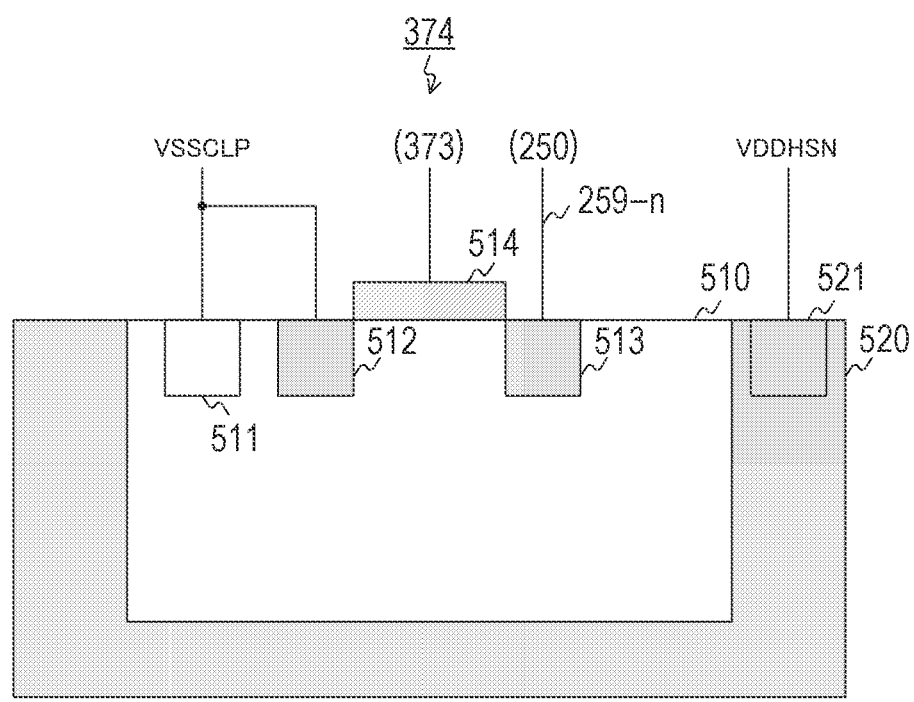

Note that, in a case where the P well 510 is the base voltage VSSHSN, as illustrated in a of FIG. 23, a deep N well 520 deeper than the P well 510 can be provided, and the power supply voltage VDDHSN can be supplied to the N layer 521 in the deep N well 520.

Alternatively, as illustrated in b of the drawing, the P well 510 may be the base voltage VSSCLP. In this case, it is necessary to form the deep N well 520 and supply the power supply voltage VDDHSN.

Note that the configuration of the nMOS transistor 373 is similar to the configuration of the nMOS transistor 374.

Figure 24:
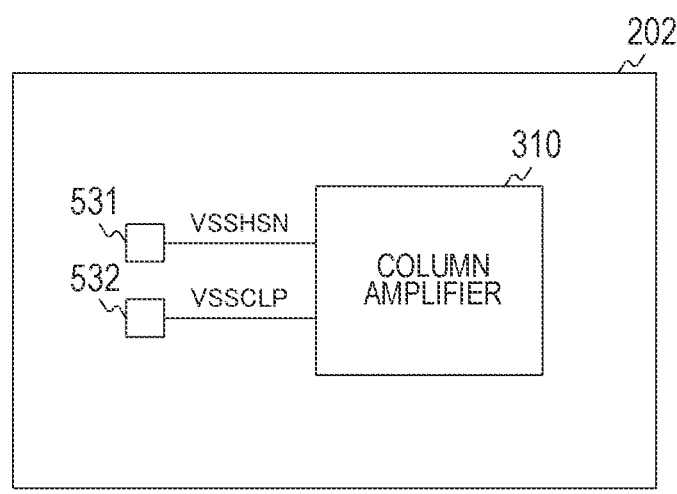
FIG. 24 is a diagram for describing a method of arranging pads according to the fifth embodiment of the present technology.
Figure 24:
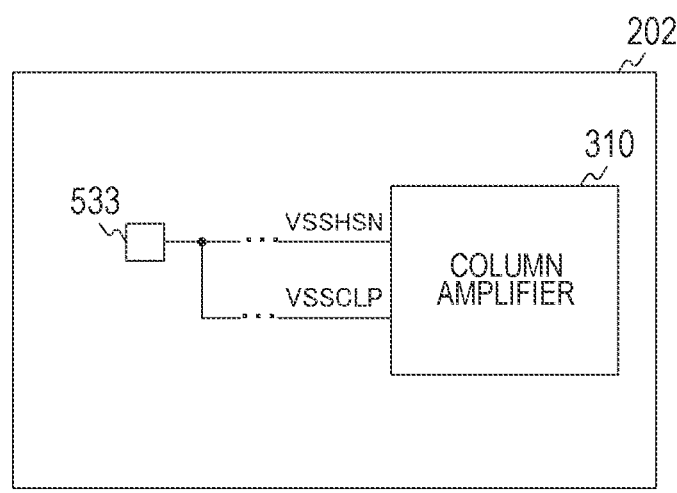

FIG. 24 is a diagram for describing a method of arranging pads according to the fifth embodiment of the present technology. In the drawing, a is an arrangement example of divided pads for the base voltage VSSHSN and the base voltage VSSCLP, and b is an arrangement example of an undivided pad. Note that, in the drawing, circuits other than the column amplifier 310 for one column are omitted.

As illustrated in a of the drawing, a pad 531 for the base voltage VSSHSN and a pad 532 for the base voltage VSSCLP are disposed on the circuit chip 202. The base voltage VSSHSN and the base voltage VSSCLP are supplied to the column amplifier 310 via these pads.

Note that, as illustrated in b of the drawing, a pad 533 for a base voltage different from the base voltage VSSHSN and the base voltage VSSCLP can be disposed. In this case, a signal line from the pad 533 is branched into two, the base voltage VSSHSN and the base voltage VSSCLP are supplied to the column amplifier 310 via different paths. In this case, a common impedance at a branch root is required to be small so as to suppress streaking.

As described above, in the fifth embodiment of the present technology, since the current mirror circuit 370 causes the mirror current to flow to the node of the base voltage VSSCLP different from the base voltage VSSHSN, the fluctuation in the IR drop of the base voltage VSSHSN on the circuit side can be suppressed. As a result, the streaking that occurs in a case where the IR drop fluctuates can be sufficiently suppressed.

6. Sixth Embodiment

In the fifth embodiment described above, the current mirror circuit 370 draws the mirror current from the vertical signal line 259-$n$, but the mirror current can be also drawn directly from the power supply voltage VDDHPX. The column amplifier 310 according to a sixth embodiment is different from the column amplifier 310 according to the fifth embodiment in that the current mirror circuit 370 draws the mirror current from the power supply voltage VDDHPX.

Figure 25:
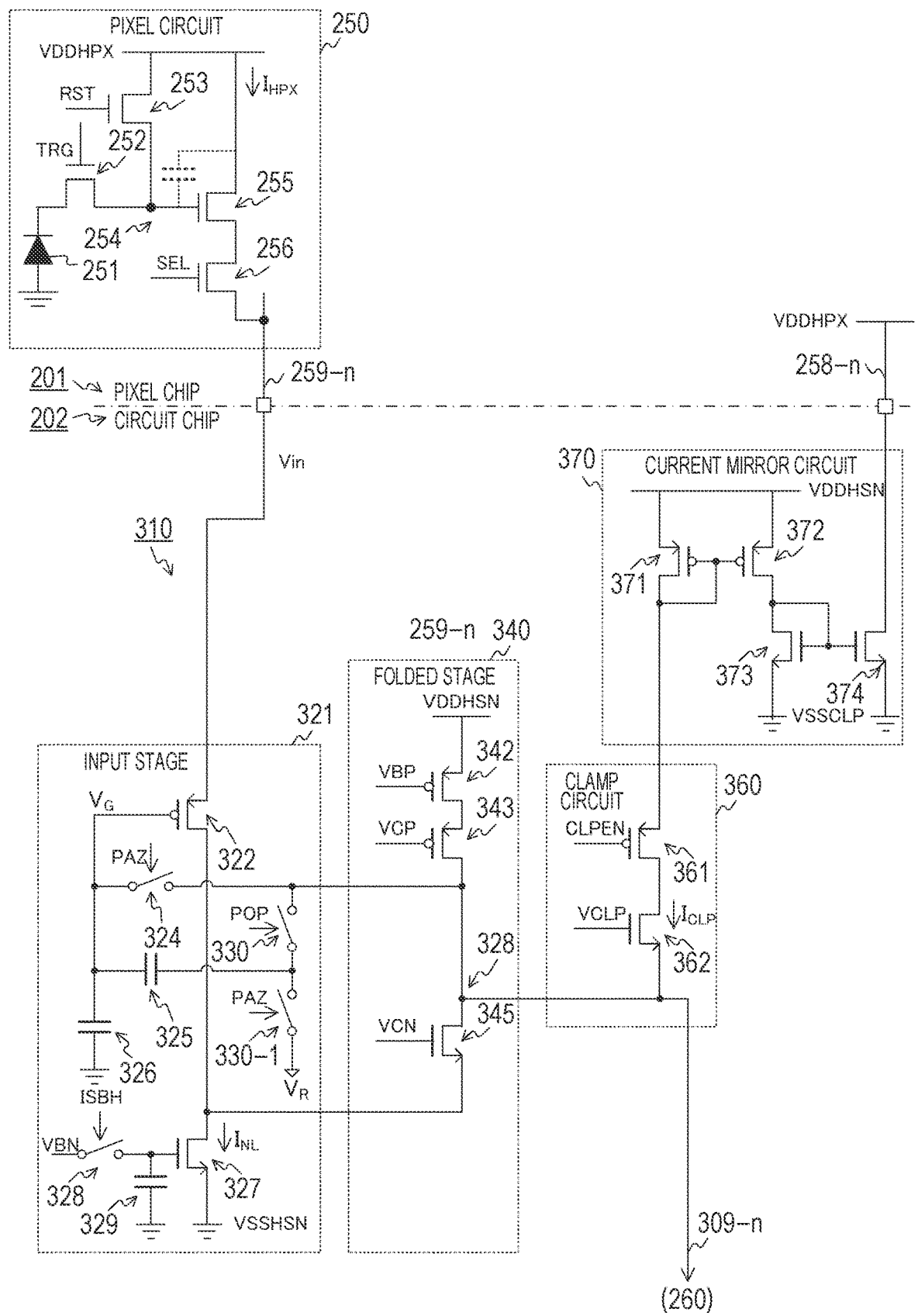
FIG. 25 is a circuit diagram depicting a configuration example of a column amplifier according to a sixth embodiment of the present technology.

FIG. 25 is a circuit diagram depicting a configuration example of the column amplifier 310 according to the sixth embodiment of the present technology. The column amplifier 310 according to the sixth embodiment is different from the column amplifier 310 according to the fifth embodiment in that the drain of the nMOS transistor 374 in the current mirror circuit 370 is connected to the node of the power supply voltage VDDHPX on the pixel side. This connection allows the current mirror circuit 370 to cause the mirror current to flow from the node of the power supply voltage VDDHPX to the base node of the base voltage VSSHSN via the signal line 258-$n$.

Note that the configurations of the nMOS transistors 373 and 374 according to the sixth embodiment are similar to the configurations in the fifth embodiment illustrated in FIGS. 22 and 23. In addition, the arrangement of the pads in the sixth embodiment is similar to the arrangement in the fifth embodiment illustrated in FIG. 24.

In addition, although the bias voltage VBN to the base side current source transistor 327 is sampled and held, the bias voltage VCLP to the clamp transistor 362 and the bias voltages VBP and VCP to the power supply side current source transistor 342 and the cascode transistor 343 can be also sampled and held. In this case, a sample and hold switch and a capacitance are only required to be added in the folded stage 340 and the clamp circuit 360.

Furthermore, the current reuse column amplifiers 320 according to the first embodiment and the first, second, fourth, and fifth modifications can be applied to the sixth embodiment.

As described above, in the sixth embodiment of the present technology, since the current mirror circuit 370 causes the mirror current to flow from the node of the power supply voltage VDDHPX to the base node of the base voltage VSSHSN, the current $I_{HPX}$ on the pixel side can be made substantially constant.

7. Seventh Embodiment

In the first embodiment described above, the enable transistor 361 and the clamp transistor 362 are disposed for each column. However, in this configuration, a circuit scale increases as the number of columns increases. The column amplifier 310 according to a seventh embodiment is different from the column amplifier 310 according to the first embodiment in that the circuit scale is reduced.

Figure 26:
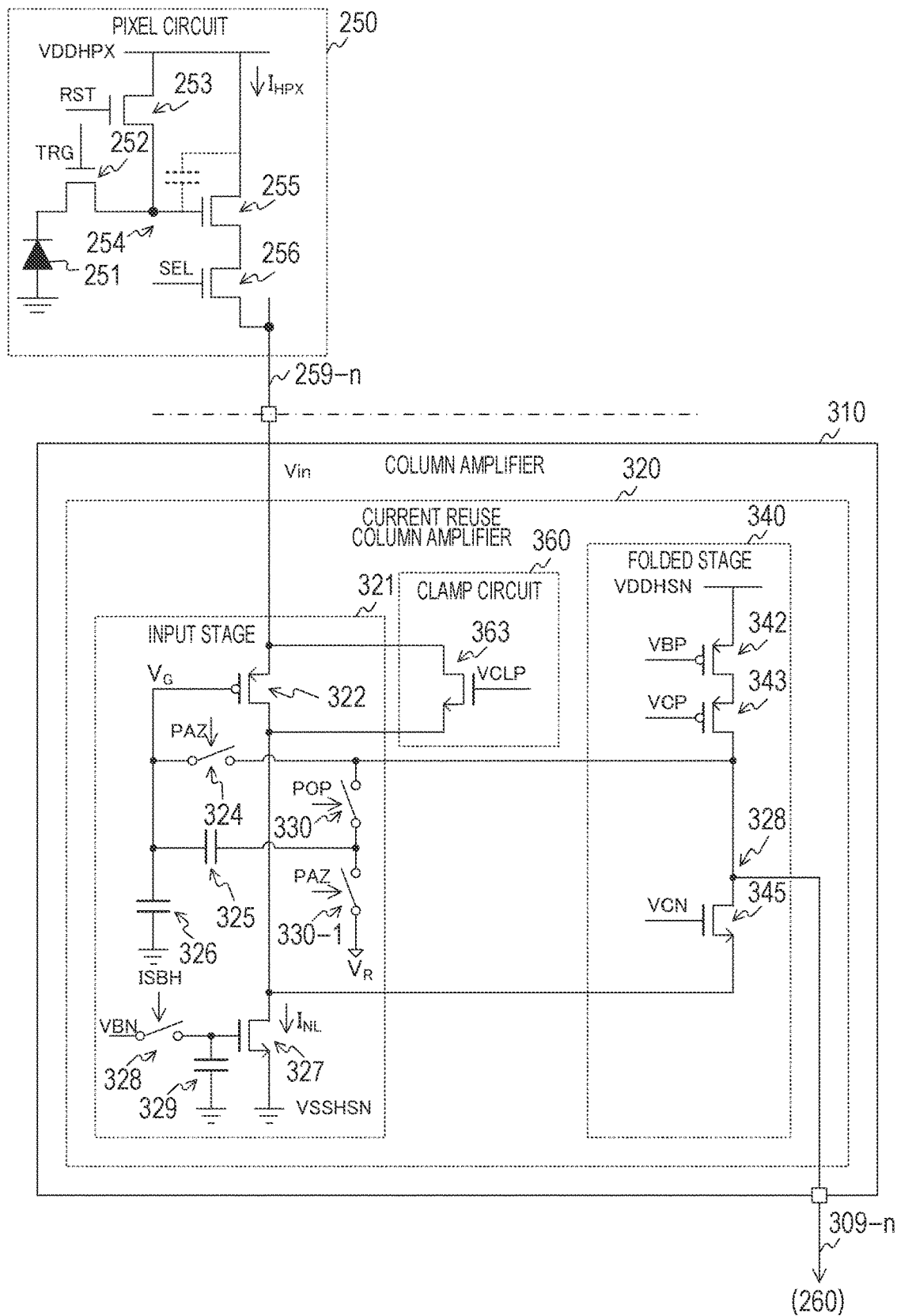
FIG. 26 is a circuit diagram depicting a configuration example of a column amplifier according to a seventh embodiment of the present technology.

FIG. 26 is a circuit diagram depicting a configuration example of the column amplifier 310 according to the seventh embodiment of the present technology. The column amplifier 310 according to the seventh embodiment is different from the column amplifier 310 according to the first embodiment in that the enable transistor 361 is reduced and the clamp transistor 363 is connected in parallel between the source and the drain of the input transistor 322. The circuit scale of the column amplifier 310 can be reduced by reducing the enable transistor 361 and the current mirror circuit 370.

In addition, the circuit configuration of the current reuse column amplifier 320 according to the seventh embodiment is similar to the circuit configuration according to the third modification of the first embodiment illustrated in FIG. 10 except that the clamp transistor 363 is added.

It should be noted that although the clamp transistor 363 can limit the decrease in the output voltage Vout, there is a possibility that the gain changes and the linearity deteriorates. In order to avoid deterioration of the linearity, the bias voltage VCN of the folded stage 340 is only required to be increased. However, there is a possibility that the output range is narrowed.

Note that, although the bias voltage VBN to the base side current source transistor 327 is sampled and held, the bias voltage VCLP to the clamp transistor 363 and the bias voltages VBP and VCP to the power supply side current source transistor 342 and the cascode transistor 343 can be also sampled and held. In this case, a sample and hold switch and a capacitance are only required to be added in the folded stage 340 and the clamp circuit 360.

Furthermore, the current reuse column amplifiers 320 according to the first embodiment and the first, second, fourth, and fifth modifications can be applied to the seventh embodiment.

Furthermore, the clamp transistor 363 according to the seventh embodiment can be added to the column amplifier 310 according to the first to fifth embodiments.

As described above, in the seventh embodiment of the present technology, since the enable transistor 361 and the current mirror circuit 370 are reduced, the circuit scale of the column amplifier 310 can be reduced accordingly.

8. Example of Application to Mobile Body

The technology of the present disclosure (the present technology) can be applied to various products. For example, the technology of the present disclosure may be implemented as a device mounted on any type of mobile body such as an automobile, an electric vehicle, a hybrid electric vehicle, a motorcycle, a bicycle, a personal mobility, an airplane, a drone, a ship, a robot, and the like.

Figure 27:
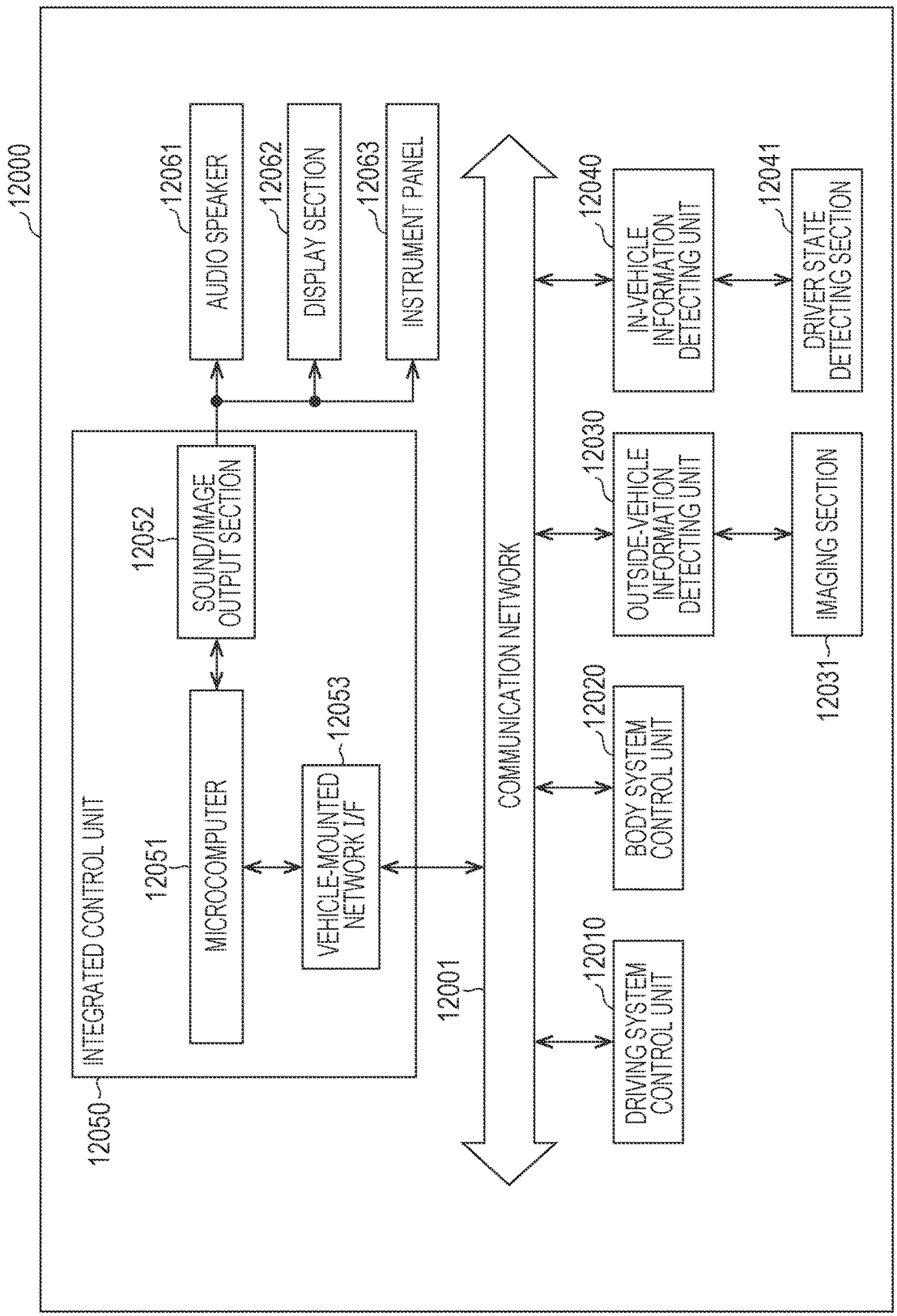
FIG. 27 is a block diagram depicting a schematic configuration example of a vehicle control system.

FIG. 27 is a block diagram depicting an example of schematic configuration of a vehicle control system as an example of a mobile body control system to which the technology of the present disclosure can be applied.

The vehicle control system 12000 includes a plurality of electronic control units connected to each other via a communication network 12001. In the example depicted in FIG. 27, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are shown as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 27, an audio speaker 12061, a display section 12062, and an instrument panel 12063 are illustrated as the output device. The display section 12062 may, for example, include at least one of an on-board display and a head-up display.

Figure 28:
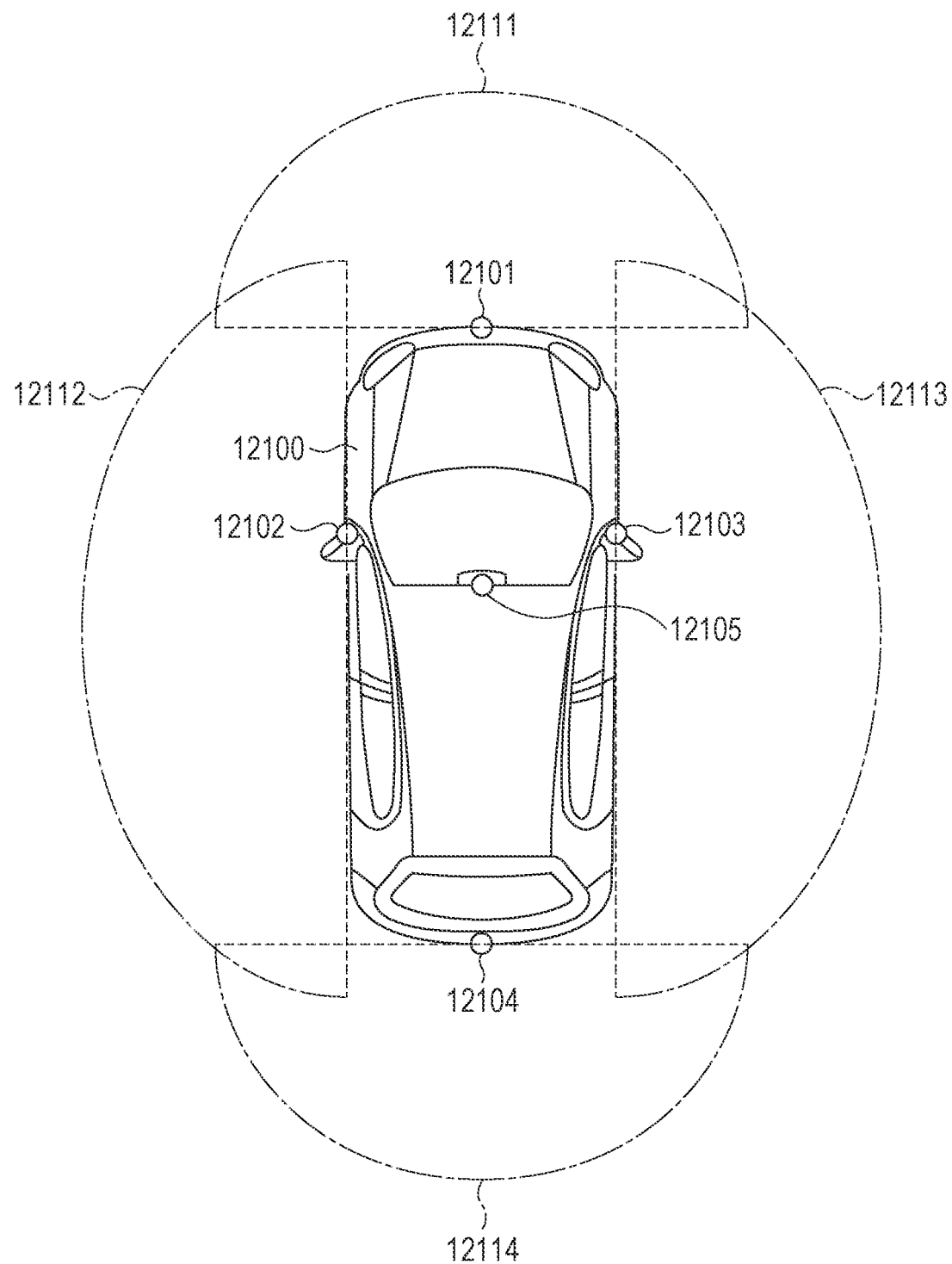
FIG. 28 is a diagram depicting an example of an installation position of an imaging section.

FIG. 28 is a diagram depicting an example of an installation position of the imaging section 12031.

In FIG. 28, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle, and the like. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 28 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology of the present disclosure can be applied has been described above. The technology of the present disclosure can be applied to, for example, the imaging section 12031 among the above-described configurations. For example, the imaging apparatus 100 in FIG. 1 can be applied to the imaging section 12031. By applying the technology according to the present disclosure to the imaging section 12031, streaking can be suppressed, a more viewable captured image can be obtained, and thus fatigue of the driver can be alleviated.

Note that the above embodiments show examples for embodying the present technology, and the matters in the embodiments and the matters specifying the invention in the claims have a corresponding relationship with each other. Similarly, the matters specifying the invention within the claims and the matters in the embodiments of the present technology having the same names have a corresponding relationship with each other. However, the present technology is not limited to the embodiments, and can be embodied by applying various modifications to the embodiments without departing from the gist of the embodiments.

Note that the effects herein described are merely examples and are not limited, and furthermore, other effects may be obtained.

Note that the present technology can have the following configurations.

(1) A solid-state imaging element includes an input transistor that outputs, from a drain, an output voltage corresponding to a voltage between a source and a gate to which an input voltage is input, a base side current source transistor that supplies a predetermined current from the drain of the input transistor to a base node determined in advance, a feedback circuit that feeds back a part of the predetermined current to the gate of the input transistor, and a clamp circuit that limits the output voltage to a value higher than a lower limit voltage determined in advance.

(2) The solid-state imaging element according to claim 1 further includes a pixel circuit that generates the input voltage by photoelectric conversion, in which the pixel circuit is provided on a pixel chip determined in advance, and the input transistor, the base side current source transistor, the feedback circuit, and the clamp circuit are provided on a circuit chip stacked on the pixel chip.

(3) In the solid-state imaging element according to (2), the clamp circuit includes a clamp transistor inserted between the drain of the input transistor and a power supply voltage determined in advance.

(4) In the solid-state imaging element according to (3), the power supply voltage includes a circuit side power supply voltage supplied to the circuit chip.

(5) In the solid-state imaging element according to (3), the power supply voltage includes a pixel side power supply voltage supplied to the pixel chip.

(6) The solid-state imaging element according to any of (3) to (5) further includes a current mirror circuit that generates a mirror current corresponding to a clamp current flowing through the clamp transistor.

(7) In the solid-state imaging element according to (6), the pixel circuit supplies the input voltage to the source of the input transistor via a vertical signal line determined in advance, and the current mirror circuit draws the mirror current from the vertical signal line.

(8) In the solid-state imaging element according to (6), the current mirror circuit causes the mirror current to flow from the pixel side power supply voltage supplied to the pixel chip to a base node determined in advance.

(9) In the solid-state imaging element according to any of (6) to (8), a voltage of the base node of the base side current source transistor includes a first base voltage, and the current mirror circuit causes the mirror current to flow to a base node of the first base voltage.

(10) In the solid-state imaging element according to any of (6) to (8), a voltage of the base node of the base side current source transistor includes a first base voltage, and the current mirror circuit causes the mirror current to flow to a base node of a second base voltage different from the first base voltage.

(11) In the solid-state imaging element according to (10), the first base voltage and the second base voltage are supplied from different pads.

(12) In the solid-state imaging element according to (10), the first base voltage and the second base voltage are supplied from an identical pad.

(13) In the solid-state imaging element according to any of (10) to (12), the first base voltage is supplied to a P layer provided in a P well, and the second base voltage is supplied to an N layer provided in the P well.

(14) In the solid-state imaging element according to any of (10) to (12), the second base voltage is supplied to the P layers and the N layers provided in the P well.

(15) In the solid-state imaging element according to (14), a power supply voltage of the current mirror circuit is supplied to an N layer provided in a deep N well.

(16) In the solid-state imaging element according to any of (1) to (15), the clamp circuit limits the output voltage in accordance with an enable signal determined in advance.

(17) In the solid-state imaging element according to (1), the clamp circuit includes a clamp transistor connected in parallel to the input transistor between the drain and the source of the input transistor.

(18) An imaging apparatus includes an input transistor that outputs, from a drain, an output voltage corresponding to a voltage between a source and a gate to which an input voltage is input, a base side current source transistor that supplies a predetermined current from the drain of the input transistor to a base node determined in advance, a feedback circuit that feeds back a part of the predetermined current to the gate of the input transistor, a clamp circuit that limits the output voltage to a value higher than a lower limit voltage determined in advance, and an analog to digital converter that converts the output voltage into a digital signal.

REFERENCE SIGNS LIST

100 Imaging apparatus
110 Optical unit
120 DSP circuit
130 Display
140 Operation unit
150 Bus
160 Frame memory
170 Storage
180 Power supply unit
200 Solid-state imaging element
201 Pixel chip
202 Circuit chip
210 Row selector
220 DAC
230 Timing control circuit
240 Pixel array unit
250 Pixel circuit
251 Photoelectric conversion element
252 Transfer transistor
253 Reset transistor
254 Floating diffusion layer
255 Amplification transistor
256 Selection transistor
260 Analog to digital conversion unit
261 ADC
262, 263, 329-2 Capacitance
264 Comparator
265 Counter
266 Latch circuit
270 Horizontal transfer scanning unit
280 Image processor
300 Constant current source unit
310 Column amplifier
320 Current reuse column amplifier
321 Input stage
322 Input transistor
323 Feedback circuit
324 Input side auto zero switch
325 Feedback capacitance
326 Base side capacitance
327, 347 Base side current source transistor
329-1 Sample and hold switch
330, 346 Intermediate switch
330-1 Reference switch
331, 341 Cascode capacitance
332, 343, 345, 353 Cascode transistor
333 Cascode side auto zero switch
340 Folded stage
342 Power supply side current source transistor
344 Output side auto zero switch
350 Boost circuit
351 Boost side capacitance
352 Boost side current source transistor
354 Boost transistor
360 Clamp circuit
361 Enable transistor
362, 363 Clamp transistor
370 Current mirror circuit
371, 372 pMOS transistor
373, 374 nMOS transistor
510 P well
511 P layer
512, 513, 521 N layer
514 Gate electrode
520 Deep N well
521 N layer
531 to 533 Pad
12031 Imaging section

The invention claimed is:

1. A solid-state imaging element comprising:
   an input transistor that outputs, from a drain, an output voltage corresponding to a voltage between a source and a gate to which an input voltage is input;
   a base side current source transistor that supplies a predetermined current from the drain of the input transistor to a base node;
   a feedback circuit that feeds back a part of the predetermined current to the gate of the input transistor, the feedback circuit including a feedback capacitor connected between the drain of the input transistor and the gate of the input transistor; and
   a clamp circuit that limits the output voltage to a value higher than a lower limit voltage.

2. The solid-state imaging element according to claim 1, further comprising a pixel circuit that generates the input voltage by photoelectric conversion, wherein
   the pixel circuit is provided on a pixel chip, and
   the input transistor, the base side current source transistor, the feedback circuit, and the clamp circuit are provided on a circuit chip stacked on the pixel chip.

3. The solid-state imaging element according to claim 2, wherein the clamp circuit includes a clamp transistor inserted between the drain of the input transistor and a power supply voltage.

4. The solid-state imaging element according to claim 3, wherein the power supply voltage is supplied as a circuit side power supply voltage supplied to the circuit chip.

5. The solid-state imaging element according to claim 3, wherein the power supply voltage is supplied as a pixel side power supply voltage supplied to the pixel chip.

6. The solid-state imaging element according to claim 1, wherein the clamp circuit limits the output voltage in accordance with an enable signal.

7. The solid-state imaging element according to claim 1, wherein the clamp circuit includes a clamp transistor connected in parallel to the input transistor between the drain and the source of the input transistor.

8. A solid-state imaging element, comprising:
   an input transistor that outputs, from a drain, an output voltage corresponding to a voltage between a source and a gate to which an input voltage is input;
   a base side current source transistor that supplies a predetermined current from the drain of the input transistor to a base node;
   a feedback circuit that feeds back a part of the predetermined current to the gate of the input transistor;
   a clamp circuit that limits the output voltage to a value higher than a lower limit voltage a pixel ciruct that generates the input voltage by photoelectric conversion, wherein
   the pixel circuit is provided on a pixel chip,
   the input transistor, the base side current source transistor, the feedback circuit, and the clamp circuit are provided on a circuit chip stacked on the pixel chip,
   the clamp circuit includes a clamp transistor inserted between the drain of the input transistor and a power supply voltage; and
   a current mirror circuit that generates a mirror current corresponding to a clamp current flowing through the clamp transistor.

9. The solid-state imaging element according to claim 8, wherein
   the pixel circuit supplies the input voltage to the source of the input transistor via a vertical signal line, and
   the current mirror circuit draws the mirror current from the vertical signal line.

10. The solid-state imaging element according to claim 8, wherein the current mirror circuit causes the mirror current to flow from a pixel side power supply voltage supplied to the pixel chip to a base voltage node.

11. The solid-state imaging element according to claim 8, wherein
    a voltage of the base node of the base side current source transistor includes a first base voltage, and
    the current mirror circuit causes the mirror current to flow to a base voltage node of the first base voltage.

12. The solid-state imaging element according to claim 8, wherein
    a voltage of the base node of the base side current source transistor includes a first base voltage, and
    the current mirror circuit causes the mirror current to flow to a second base node of a second base voltage different from the first base voltage.

13. The solid-state imaging element according to claim 12, wherein the first base voltage and the second base voltage are supplied from different pads.

14. The solid-state imaging element according to claim 12, wherein the first base voltage and the second base voltage are supplied from an identical pad.

15. The solid-state imaging element according to claim 12, wherein
    the first base voltage is supplied to a P layer provided in a P well, and
    the second base voltage is supplied to an N layer provided in the P well.

16. The solid-state imaging element according to claim 15, wherein the second base voltage is supplied to the P layer and the N layer provided in the P well.

17. The solid-state imaging element according to claim 16, wherein a power supply voltage of the current mirror circuit is supplied to an N layer provided in a deep N well.

18. An imaging apparatus comprising the solid-state imaging element according to claim 8.

19. An imaging apparatus comprising:
    an input transistor that outputs, from a drain, an output voltage corresponding to a voltage between a source and a gate to which an input voltage is input;
    a base side current source transistor that supplies a predetermined current from the drain of the input transistor to a base node;
    a feedback circuit that feeds back a part of the predetermined current to the gate of the input transistor, the feedback circuit including a feedback capacitor connected between the drain of the input transistor and the gate of the input transistor;
    a clamp circuit that limits the output voltage to a value higher than a lower limit voltage; and
    an analog to digital converter that converts the output voltage into a digital signal.

* * * * *